United States Patent
Ono et al.

(10) Patent No.: US 12,330,404 B2
(45) Date of Patent: Jun. 17, 2025

(54) LAMINATES HAVING PERFORATED STRUCTURAL BODY

(71) Applicant: KURARAY CO., LTD., Kurashiki (JP)

(72) Inventors: Tomohiro Ono, Tsukuba (JP); Kanayo Nakada, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 336 days.

(21) Appl. No.: 17/417,447

(22) PCT Filed: Dec. 25, 2019

(86) PCT No.: PCT/JP2019/051016
§ 371 (c)(1),
(2) Date: Jun. 23, 2021

(87) PCT Pub. No.: WO2020/138237
PCT Pub. Date: Jul. 2, 2020

(65) Prior Publication Data
US 2022/0055361 A1    Feb. 24, 2022

(30) Foreign Application Priority Data
Dec. 27, 2018  (JP) ................................. 2018-245071

(51) Int. Cl.
B32B 27/30    (2006.01)
B32B 3/26     (2006.01)

(52) U.S. Cl.
CPC ............ *B32B 27/308* (2013.01); *B32B 3/266* (2013.01); *B32B 2250/02* (2013.01); *B32B 2307/748* (2013.01); *B32B 2405/00* (2013.01)

(58) Field of Classification Search
CPC ... B32B 27/308; B32B 3/266; B32B 2250/02; B32B 2307/748; B32B 2405/00
See application file for complete search history.

(56) References Cited

U.S. PATENT DOCUMENTS

| | | | |
|---|---|---|---|
| 5,264,527 A | 11/1993 | Varshney et al. | |
| 2009/0075055 A1 | 3/2009 | Vetrovec et al. | |
| 2009/0105396 A1* | 4/2009 | Fujihara | C08L 53/00 524/505 |
| 2009/0239433 A1* | 9/2009 | Kurihara | C09J 167/04 428/476.3 |
| 2015/0284596 A1* | 10/2015 | Nakada | C08F 297/026 525/309 |
| 2017/0274600 A1* | 9/2017 | Sugiyama | B29C 64/147 |
| 2018/0112023 A1* | 4/2018 | Sugawara | C08L 53/00 |
| 2019/0390024 A1 | 12/2019 | Negi et al. | |
| 2022/0056316 A1* | 2/2022 | Ono | B32B 27/304 |

FOREIGN PATENT DOCUMENTS

| | | | |
|---|---|---|---|
| CN | 201459013 U | 5/2010 | |
| EP | 3 061 798 A1 | 8/2016 | |
| EP | 3 575 351 A1 | 12/2019 | |
| JP | 5-507737 A | 11/1993 | |
| JP | 6-93060 A | 4/1994 | |
| JP | 11-335432 A | 12/1999 | |
| JP | 2009-72986 A | 4/2009 | |
| JP | 2009-79120 A | 4/2009 | |
| JP | 2013-224430 A | 10/2013 | |
| JP | 2017-145315 A | 8/2017 | |
| KR | 10-2016-0074495 | 6/2016 | |
| WO | WO-2016190138 A1 * | 12/2016 | ............ C08F 297/02 |
| WO | WO 2018/139655 A1 | 8/2018 | |

OTHER PUBLICATIONS

International Search Report Issued March 3. 2020 In PCT/JP2019/051016 (with English translation), 6 pages.
Written Opinion of the International Searching Authority issued March 3. 2020 in PCT/JP2019/051016 (with English translation), 7 pages.
Moineau, G., et al., "Effect of the catalyst on the molecular control and the rheological properties of the triblock copolymers", Macromolecular Chemistry and Physics, 2000, vol. 201, pp. 1108-1114.
Extended European Search Report issued Jul. 22, 2022, in corresponding European Patent Application No. 19904689.7, 13 pages.

* cited by examiner

*Primary Examiner* — Alicia J Weydemeyer
*Assistant Examiner* — Laura B Figg
(74) *Attorney, Agent, or Firm* — Oblon, McClelland, Maier & Neustadt, L.L.P.

(57) ABSTRACT

A laminate is provided which includes a substrate and a structural body including a base portion and a through hole and which can concurrently satisfy stickiness and releasability and can be released with no or little adhesive residue. The laminate includes a substrate and a structural body disposed on the surface of at least one side of the substrate, the structural body including a base portion and a through hole. The base portion of the structural body includes an acrylic triblock copolymer (I) and no tackifier resins or includes an acrylic triblock copolymer (I) and a tackifier resin in a tackifier resin/(I) mass ratio of not more than 20/100. The acrylic triblock copolymer (I) includes two polymer blocks (A1) and (A2) each including methacrylic acid ester units and one polymer block (B) including acrylic acid ester units represented by the general formula $CH_2=CH-COOR^1$ (1) (wherein $R^1$ denotes a C4-C12 organic group). The acrylic triblock copolymer (I) has an (A1)-(B)-(A2) block structure and a weight average molecular weight of 50,000 to 250,000. The total content of the polymer blocks (A1) and (A2) is not more than 35 mass % of the acrylic triblock copolymer (I).

9 Claims, No Drawings

LAMINATES HAVING PERFORATED STRUCTURAL BODY

TECHNICAL FIELD

The present invention relates to laminates that have a structural body which includes a base portion including an acrylic triblock copolymer, and through holes.

BACKGROUND ART

Perforated structural bodies are conventionally fabricated by methods such as, for example, pinholing or other post-processing of solid bodies such as sheets, or by punching fibrous materials. Unfortunately, the production of these structural bodies is laborious.

An approach to solving this troublesome problem is a laminate which includes a substrate sheet and one or more perforated thermoplastic elastomer layers that are mold-printed on the surface of one side or both sides of the substrate sheet (see, for example, Patent Literature 1). The structural bodies such as sheets are sometimes made of elastomers. In such cases, stickiness is one of the performances expected to benefit from the elastomer's softness. Operations such as alignment often require not only that the elastomeric structural body have stickiness to an adherend but also that the elastomeric structural body be releasable from the adherend or from other sheet of the elastomeric structural body. Further, additional performances are sometimes required such as that the structural body can be released with no or little adhesive residue, and that the structural body does not easily separate from the substrate.

CITATION LIST

Patent Literature

Patent Literature 1: JP-A-2009-072986

SUMMARY OF INVENTION

Technical Problem

Unfortunately, releasability tends to be enhanced at the cost of stickiness of the structural body with respect to the substrate. Further, improving the adhesive residue problem tends to result in deterioration in the stickiness of the structural body with respect to an adherend. Thus, it has been difficult to manufacture a structural body that satisfies all of these characteristics.

An object of the present invention is to provide a laminate which includes a substrate and a structural body including a base portion and through holes and which can concurrently satisfy stickiness and releasability, can be released with no or little adhesive residue, and is also excellent in applicability.

Solution to Problem

In some aspects of the present invention, the above object is achieved by:

[1] A laminate including a substrate and a structural body disposed on the surface of at least one side of the substrate, the structural body including a base portion and a through hole, wherein
the base portion of the structural body includes an acrylic triblock copolymer (I) and is free from tackifier resins, the acrylic triblock copolymer (I) including two polymer blocks (A1) and (A2) each including methacrylic acid ester units and one polymer block (B) including acrylic acid ester units represented by the general formula $CH_2=CH-COOR^1$ (1) (wherein $R^1$ denotes a C4-C12 organic group), the acrylic triblock copolymer (I) having an (A1)-(B)-(A2) block structure and a weight average molecular weight of 50,000 to 250,000, the total content of the polymer blocks (A1) and (A2) being not more than 35 mass % of the acrylic triblock copolymer (I).

[2] A laminate including a substrate and a structural body disposed on the surface of at least one side of the substrate, the structural body including a base portion and a through hole, wherein
the base portion of the structural body includes an acrylic triblock copolymer (I) and a tackifier resin, the acrylic triblock copolymer (I) including two polymer blocks (A1) and (A2) each including methacrylic acid ester units and one polymer block (B) including acrylic acid ester units represented by the general formula $CH_2=CH-COOR^1$ (1) (wherein $R^1$ denotes a C4-C12 organic group), the acrylic triblock copolymer (I) having an (A1)-(B)-(A2) block structure and a weight average molecular weight of 50,000 to 250,000, the total content of the polymer blocks (A1) and (A2) being not more than 35 mass % of the acrylic triblock copolymer (I), the tackifier resin/acrylic triblock copolymer (I) mass ratio being not more than 20/100.

Advantageous Effects of Invention

The laminates obtained in the present invention include a substrate and a structural body including a base portion and a through hole, and can concurrently satisfy stickiness and releasability, can be released with no or little adhesive residue, and are also excellent in applicability.

DESCRIPTION OF EMBODIMENTS

Hereinbelow, the present invention will be described in detail. In the present specification, "(meth)acrylic acid esters" is a general term for "methacrylic acid esters" and "acrylic acid esters", and "(meth)acrylic" is a general term for "methacrylic" and "acrylic".

A laminate of the present invention has a structural body which includes a base portion including an acrylic triblock copolymer (I), and through holes. By virtue of the structural body including the above base portion and through holes, the laminate is not only excellent in breathability but also exhibits excellent releasability when the laminate that has been bonded is released for alignment or other purpose. Further, adhesive residue can be prevented. Furthermore, the structural body present in the laminate can be applied to an adherend with reduced probability of wrinkles or air traps, that is, the laminate attains excellent applicability.

In a preferred embodiment, the structural body is composed of a base portion which is a continuous network including an acrylic triblock copolymer (I), and through holes. The laminate having such a structure not only attains higher breathability but also concurrently satisfies stickiness and releasability more efficiently. In addition, the adhesive residue problem and applicability are further improved.

Examples of the network shapes include mesh shapes, honeycomb shapes, scale shapes and tile shapes. For example, the structural body may be dotted or striped with discrete through holes.

The portion of the above structural body other than the through holes (the base portion) includes an acrylic triblock copolymer (I). The acrylic triblock copolymer (I) includes two polymer blocks (A1) and (A2) each including methacrylic acid ester units, and one polymer block (B) including acrylic acid ester units represented by the general formula $CH_2=CH-COOR^1$ (1) (wherein $R^1$ denotes a C4-C12 organic group). The acrylic triblock copolymer (I) has an (A1)-(B)-(A2) block structure and a weight average molecular weight of 50,000 to 250,000. The total content of the polymer blocks (A1) and (A2) is not more than 35 mass % of the copolymer.

The acrylic triblock copolymer (I) which forms the base portion of the structural body allows the laminate to exhibit not only good stickiness but also excellent releasability.

(Polymer Blocks (A1) and (A2))

The acrylic triblock copolymer (I) has two polymer blocks including methacrylic acid ester units, namely, polymer block (A1) and (A2) each including methacrylic acid ester units.

Examples of the methacrylic acid esters which form structural units of the polymer blocks (A1) and (A2) include methacrylic acid esters having no functional groups such as methyl methacrylate, ethyl methacrylate, isopropyl methacrylate, n-propyl methacrylate, n-butyl methacrylate, isobutyl methacrylate, sec-butyl methacrylate, tert-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate, isobornyl methacrylate, phenyl methacrylate and benzyl methacrylate; and methacrylic acid esters having a functional group such as methoxyethyl methacrylate, ethoxyethyl methacrylate, diethylaminoethyl methacrylate, 2-hydroxyethyl methacrylate, 2-aminoethyl methacrylate, glycidyl methacrylate and tetrahydrofurfuryl methacrylate.

Among those described above, methacrylic acid esters having no functional groups are preferable to enhance the heat resistance and durability of the polymer that is obtained. Methyl methacrylate, ethyl methacrylate, tert-butyl methacrylate, cyclohexyl methacrylate, isobornyl methacrylate and phenyl methacrylate are more preferable.

Methyl methacrylate is still more preferable for the reason that the phase separation between the polymer blocks (A1) and (A2) and the polymer block (B) becomes clearer, and the perforated structural body which includes a base portion containing such an acrylic triblock copolymer (I) attains a higher cohesive force. The polymer blocks (A1) and (A2) may be composed of a single kind of a methacrylic acid ester or may be composed of two or more kinds of methacrylic acid esters. The acrylic triblock copolymer (I) has two polymer blocks (A1) and (A2) as polymer blocks including methacrylic acid ester units. The methacrylic acid esters constituting these polymer blocks (A1) and (A2) may be the same as or different from one another. Further, the proportions of the methacrylic acid ester units present in the polymer blocks (A1) and (A2) are preferably not less than 60 mass % in each of the polymer blocks (A1) and (A2), more preferably not less than 80 mass %, still more preferably not less than 90 mass %, and further preferably not less than 95 mass %. The proportions of the methacrylic acid ester units in the polymer blocks (A1) and (A2) may be each 100 mass %.

In the polymer blocks (A1) and (A2) each including methacrylic acid ester units, the methacrylic acid ester units may have the same stereoregularity or different stereoregularities.

In the acrylic triblock copolymer (I), the total content of the polymer blocks (A1) and (A2) is not more than 35 mass %, preferably not more than 30 mass %, and still more preferably not more than 25 mass %. The total content of the polymer blocks (A1) and (A2) is preferably not less than 4 mass %, and more preferably not less than 8 mass %. When the total content of the polymer blocks (A1) and (A2) is in the above range, the perforated structural body which includes a base portion containing such an acrylic triblock copolymer (I) tends to have a higher cohesive force and also attains further enhancements in tackiness and bond strength. Furthermore, the structural body tends to attain further enhancements in heat-resistant adhesion and holding power. The respective contents of the polymer blocks (A1) and (A2) present in the acrylic triblock copolymer (I) may be the same as or different from each other.

The glass transition temperatures (Tg) of the polymer blocks (A1) and (A2) are preferably each 60 to 140° C., more preferably 70 to 130° C., and still more preferably 80 to 130° C. When the glass transition temperatures are in this range, the polymer blocks (A1) and (A2) act as physical pseudo-crosslinking sites and produce a cohesive force at normal service temperatures of the laminate of the present invention, and the laminate that is obtained exhibits excellent properties such as adhesive characteristics, durability and heat resistance. The glass transition temperature in the present specification is the extrapolated onset temperature determined with respect to a DSC curve.

The respective temperatures Tg of the polymer blocks (A1) and (A2) may be the same as or different from each other. In a preferred embodiment, the temperatures Tg of the polymer blocks (A1) and (A2) may be different from each other but both fall in the range described above.

(Polymer Block (B))

The acrylic triblock copolymer (I) has one polymer block (B) including acrylic acid ester units represented by the general formula $CH_2=CH-COOR^1$ (1) (wherein $R^1$ denotes a C4-C12 organic group (hereinafter, such units are also written as the acrylic acid ester (1) units). By virtue of the acrylic acid ester (1) units being contained in the polymer block (B), the laminate that is obtained tends to attain good releasability and to leave no or little adhesive residue when the laminate is, for example, released.

Examples of the acrylic acid esters (1) include acrylic acid esters having no functional groups such as n-butyl acrylate, isobutyl acrylate, sec-butyl acrylate, tert-butyl acrylate, n-pentyl acrylate, isopentyl acrylate, n-hexyl acrylate, 2-ethylhexyl acrylate, n-octyl acrylate, isooctyl acrylate, decyl acrylate, isobornyl acrylate, lauryl acrylate, cyclohexyl acrylate, phenyl acrylate and benzyl acrylate; and acrylic acid esters having a functional group such as 2-ethoxyethyl acrylate, 2-(diethylamino)ethyl acrylate, tetrahydrofurfuryl acrylate and 2-phenoxyethyl acrylate.

Among those described above, at least one selected from n-butyl acrylate, 2-ethylhexyl acrylate, n-octyl acrylate and isooctyl acrylate is more preferable for the reasons that the phase separation between the polymer blocks (A1) and (A2) and the polymer block (B) becomes clearer, and the obtainable structural body attains an increased cohesive force, and that the laminate that is obtained exhibits appropriate stickiness to offer releasability in a wide range of temperatures and leaves no or little adhesive residue when the laminate is, for example, released. For the same reasons, n-butyl acrylate and 2-ethylhexyl acrylate are still more preferable.

The polymer block (B) may be composed of a single kind of an acrylic acid ester or may be composed of two or more kinds of acrylic acid esters. The proportion of the acrylic acid ester units present in the polymer block (B) is preferably not less than 60 mass %, more preferably not less than 80 mass %, still more preferably not less than 90 mass %, and further preferably not less than 95 mass %. The proportion of the acrylic acid ester units in the polymer block (B) may be 100 mass %.

When the polymer block (B) is a copolymer of a plurality of monomers, the copolymer may be a random copolymer, a block copolymer or a graft copolymer.

The glass transition temperature of the polymer block (B) is more preferably −100 to 30° C., still more preferably −80 to 10° C., and further preferably −75 to 0° C. When the glass transition temperature is in this range, the obtainable structural body in the laminate is flexible and has high stickiness at service temperatures.

The polymer blocks (A1) and (A2) and the polymer block (B) may contain monomer units which are common to one another while ensuring that the advantageous effects of the present invention are not impaired. For example, there may be a tapered structure at the boundaries between the polymer block (A1) or (A2) and the polymer block (B). Alternatively, the polymer block (A1) or (A2) and the polymer block (B) may be of completely different monomer units from each other.

The polymer blocks (A1) and (A2) and the polymer block (B) may include additional monomers as required.

Examples of such additional monomers include vinyl monomers having a carboxyl group such as (meth)acrylic acid, crotonic acid, maleic acid, maleic anhydride and fumaric acid; vinyl monomers having a functional group such as (meth)acrylamide, (meth)acrylonitrile, vinyl acetate, vinyl chloride and vinylidene chloride; aromatic vinyl monomers such as styrene, α-methylstyrene, p-methylstyrene and m-methylstyrene; conjugated diene monomers such as butadiene and isoprene; olefin monomers such as ethylene, propylene, isobutene and octene; and lactone monomers such as ε-caprolactone and valerolactone. When any of the polymer blocks contains such additional monomers, the content thereof is preferably not more than 20 mass %, more preferably not more than 10 mass %, and still more preferably not more than 5 mass % of the total mass of the monomers constituting the polymer block.

The polymer block (A1), the polymer block (B) and the polymer block (A2) are bonded in this order. That is, the acrylic triblock copolymer (I) has an (A1)-(B)-(A2) block structure in which (A1) is the polymer block (A1), (A2) is the polymer block (A2) and (B) is the polymer block (B). By virtue of the acrylic triblock copolymer (I) having this structure, the structural body attains excellent bond strength, holding power and cohesive force.

The acrylic triblock copolymer (I) has a weight average molecular weight (Mw) of 50,000 to 250,000. From the points of view of cohesive force and handleability during production, this molecular weight is preferably 55,000 to 230,000, more preferably 60,000 to 220,000, and still more preferably 65,000 to 200,000. If the Mw of the acrylic triblock copolymer (I) is less than 50,000, the cohesive force may be poor. If the Mw exceeds 250,000, low handleability may be encountered during production.

The molecular weight distribution (Mw/Mn) of the acrylic triblock copolymer (I) is preferably 1.0 to 1.5, and more preferably 1.0 to 1.4. The weight average molecular weight (Mw) and the number average molecular weight (Mn) in the present specification are the weight average molecular weight and the number average molecular weight measured by gel permeation chromatography (GPC) relative to standard polystyrenes.

The acrylic triblock copolymer (I) used in the present invention may be produced by any method without limitation in accordance with a known technique as long as the polymer that is obtained satisfies the chemical structure conditions of the present invention. In general, a block copolymer with a narrow molecular weight distribution is obtained by the living polymerization of monomers that will form structural units. Examples of the living polymerization processes include living polymerization using an organic rare earth metal complex as a polymerization initiator (see JP-A-H06-93060), living anionic polymerization performed with an organic alkali metal compound as a polymerization initiator in the presence of a mineral acid salt such as an alkali metal or alkaline earth metal salt (see JP-A-H05-507737), living anionic polymerization performed with an organic alkali metal compound as a polymerization initiator in the presence of an organoaluminum compound (see JP-A-H11-335432), and atom transfer radical polymerization (ATRP) (see Macromolecular Chemistry and Physics, 2000, vol. 201, pp. 1108-1114).

Among these production processes, living anionic polymerization performed with an organic alkali metal compound as a polymerization initiator in the presence of an organoaluminum compound is advantageous in that the obtainable block copolymer has high transparency, is less odorous because of little residual monomers, and can be applied as the base portion of the structural body while ensuring that few bubbles will be generated after the application. Other advantages are that the methacrylic acid ester polymer blocks have a highly syndiotactic molecular structure to effectively increase the heat resistance of the base portion of the structural body, and that the living polymerization is feasible under relatively mild temperature conditions and thus the environmental load in industrial production (mainly the electricity for refrigerators to control the polymerization temperature) is small.

Examples of the organoaluminum compounds include those organoaluminum compounds represented by the following general formula (2).

$$AlR^2R^3R^4 \qquad (2)$$

(In the formula (2), $R^2$, $R^3$ and $R^4$ are each independently an optionally substituted alkyl group, an optionally substituted cycloalkyl group, an optionally substituted aryl group, an optionally substituted aralkyl group, an optionally substituted alkoxy group, an optionally substituted aryloxy group or an N,N-disubstituted amino group, or $R^2$ is any of these groups and $R^3$ and $R^4$ together form an optionally substituted arylenedioxy group.)

From points of view such as high living properties in the polymerization and easy handling, some preferred organoaluminum compounds represented by the general formula (2) are isobutylbis(2,6-di-tert-butyl-4-methylphenoxy)aluminum, isobutylbis(2,6-di-tert-butylphenoxy)aluminum and isobutyl [2,2'-methylenebis(4-methyl-6-tert-butylphenoxy)] aluminum.

Examples of the organic alkali metal compounds include alkyllithiums and alkyldilithiums such as n-butyllithium, sec-butyllithium, isobutyllithium, tert-butyllithium, n-pentyllithium and tetramethylenedilithium; aryllithiums and aryldilithiums such as phenyllithium, p-tolyllithium and lithiumnaphthalene; aralkyllithiums and aralkyldilithiums such as benzyllithium, diphenylmethyllithium and dilithium formed by the reaction of diisopropenylbenzene and butyllithium; lithiumamides such as lithiumdimethylamide; and lithium alkoxides such as methoxylithium and ethoxylithium. These compounds may be used singly, or two or more may be used in combination. In particular, alkyllithiums are preferable because of high polymerization initiation efficiency. Tert-butyllithium and sec-butyllithium are more preferable, and sec-butyllithium is still more preferable.

The living anionic polymerization is usually carried out in the presence of a solvent that is inactive in the polymerization reaction. Examples of the solvents include aromatic hydrocarbons such as benzene, toluene and xylene; halogenated hydrocarbons such as chloroform, methylene chloride and carbon tetrachloride; and ethers such as tetrahydrofuran and diethyl ether. Toluene is preferably used.

The block copolymer may be produced by, for example, repeating as many times as desired a step in which a desired polymer block (such as a polymer block (A2) or a polymer block (B)) is formed onto a desired living polymer end obtained by the polymerization of a monomer, and thereafter terminating the polymerization reaction. Specifically, the acrylic triblock copolymer (I) may be produced by, for example, performing polymerization with an organic alkali metal compound as a polymerization initiator in the presence of an organoaluminum compound through a plurality of steps including a first step of polymerizing a monomer for forming a first polymer block, a second step of polymerizing a monomer for forming a second polymer block, and a third step of polymerizing a monomer for forming a third polymer block, and terminating the polymerization reaction by reacting the active end of the resultant polymer with a terminator such as an alcohol. By this method, a triblock copolymer composed of polymer block (A1)-polymer block (B)-polymer block (A2) may be produced.

The polymerization temperature is preferably 0 to 100° C. when the reaction forms the polymer block (A1) or (A2), and is preferably-50 to 50° C. when the reaction forms the polymer block (B). If the polymerization temperature is below this range, the reaction is slow and takes a long time to complete. If, on the other hand, the polymerization temperature is higher than the above range, more living polymer ends are deactivated to broaden the molecular weight distribution or to cause a failure to obtain the desired block copolymer. The polymerization of the polymer blocks (A1) and (A2) and that of the polymer block (B) may be each accomplished in 1 second to 20 hours.

The base portion of the structural body of the present invention contains components including the acrylic triblock copolymer (I) described above. While the content of the acrylic triblock copolymer (I) relative to the components of the base portion is not particularly limited as long as the advantageous effects of the present invention are achieved, the acrylic triblock copolymer (I) preferably represents not less than 80 mass %, more preferably not less than 85 mass %, and still more preferably not less than 90 mass % of the components of the base portion, and may represent 100 mass % of the base portion. When the acrylic triblock copolymer (I) represents not less than 80 mass % of the base portion, the base portion tends to exhibit its characteristics more prominently.

In the laminate of the first aspect of the present invention, the base portion of the structural body does not contain a tackifier resin. The laminate of the first aspect is advantageous in that adhesive residue can be reliably prevented.

In a laminate of the second aspect of the present invention, the components of the base portion of the structural body may include a tackifier resin with the proviso that the tackifier resin/acrylic triblock copolymer (I) mass ratio is not more than 20/100. The laminate of the second aspect is advantageous in that stickiness and the control of adhesive residue can be easily satisfied concurrently. In the laminate of the second aspect, the tackifier resin/acrylic triblock copolymer (I) mass ratio is preferably not more than 15/100 in order to reliably prevent adhesive residue.

The tackifier resin which may be added to the base portion of the structural body of the second aspect is not particularly limited and may be any tackifier resin conventionally used in adhesives. Examples thereof include rosin resins (such as rosins, rosin derivatives and hydrogenated rosin derivatives), terpene resins, terpene phenol resins, (hydrogenated) petroleum resins, styrene resins, xylene resins, hydrogenated aromatic copolymers, phenol resins and coumarone-indene resins.

The rosin resins are amber and amorphous natural resins obtained from pine and are chiefly composed of a mixture of abietic acid and isomers thereof. By making use of the reactivity of abietic acid or isomers thereof, the rosin resins may be modified by esterification, polymerization, hydrogenation and the like. Examples thereof include unmodified rosins (such as, for example, tall rosin, gum rosin and wood rosin), and modified rosins such as polymerized rosins, disproportionated rosins, hydrogenated rosins, maleic acid-modified rosins, fumaric acid-modified rosins, and esters thereof (such as, for example, glycerol esters, pentaerythritol esters, methyl esters, ethyl esters, butyl esters and ethylene glycol esters) which may be further hydrogenated (hereinafter, also written as hydrogenated rosin esters). In particular, hydrogenated rosin esters may be preferably used from the points of view of heat resistance and discoloration resistance.

The terpene resins are oligomers obtained by polymerizing raw materials including terpene monomers. The oligomers thus obtained may be modified, for example, hydrogenated. Such modified oligomers are also included in the terpene resins. Terpenes generally indicate polymers of isoprene ($C_5H_8$) and are classified into monoterpene ($C_{10}H_{16}$), sesquiterpene ($C_{15}H_{24}$), diterpene ($C_{20}H_{32}$) and the like. The terpene monomers are monomers which have these structures as base skeletons. Examples thereof include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, γ-terpineol, sabinene, paramenthadienes and carenes. The raw materials including terpene monomers may include other monomers copolymerizable with the terpene monomers. Examples of such additional monomers include coumarone monomers such as benzofuran ($C_8H_6O$); vinyl aromatic compounds such as styrene, α-methylstyrene, vinyltoluene, divinyltoluene and 2-phenyl-2-butene; and phenolic monomers such as phenol, cresol, xylenol, propylphenol, nolylphenol, hydroquinone, resorcinol, methoxyphenol, bromophenol, bisphenol A and bisphenol F. Examples of the oligomers obtained by polymerizing raw materials including terpene monomers and additional copolymerizable monomers include terpene phenol resins. The oligomers thus obtained may be modified, for example, hydrogenated. Such modified oligomers are also included in the terpene resins.

The (hydrogenated) petroleum resins are oligomers obtained by polymerizing a raw material including a $C_5$ fraction, a $C_9$ fraction, a component(s) purified from a $C_5$ fraction, a component(s) purified from a $C_9$ fraction, or a mixture of these fractions or purified components. The oligomers thus obtained may be modified, for example, hydrogenated. Such modified oligomers are also included in the (hydrogenated) petroleum resins. The $C_5$ fraction usually includes, for example, cyclopentadiene, dicyclopentadiene, isoprene, 1,3-pentadiene, 2-methyl-1-butene, 2-methyl-2- butene, 1-pentene, 2-pentene and cyclopentene. The $C_9$ fraction usually includes, for example, styrene, allylbenzene, α-methylstyrene, vinyltoluene, β-methylstyrene and indene. The $C_9$ fraction sometimes includes small amounts of a $C_8$ fraction and a $C_{10}$ fraction.

The (hydrogenated) petroleum resins are largely classified into $C_5$ resins obtained from a $C_5$ fraction or a component(s) purified therefrom, $C_9$ resins obtained from a $C_9$ fraction or a component(s) purified therefrom, and $C_5$-$C_9$ copolymer resins obtained from a mixture of a $C_5$ fraction or a component(s) purified therefrom, and a $C_9$ fraction or a component(s) purified therefrom. Of these resins, hydrogenated petroleum resins may be preferably used from the points of view of heat resistance and discoloration resistance.

In the present invention, the aromatic hydrocarbon resins such as styrene resins, xylene resins, hydrogenated aromatic copolymers and phenol resins are oligomers obtained by polymerizing a raw material including, for example, styrene, α-methylstyrene, vinyltoluene, β-methylstyrene, divinyltoluene, 2-phenyl-2-butene, methoxystyrene, t-butylstyrene, chlorostyrene, indene, methylindene, phenol, cresol, xylenol, propylphenol, nolylphenol, hydroquinone, resorcin, methoxyphenol, bromophenol, bisphenol A, bisphenol F or a mixture thereof. The oligomers thus obtained may be modified, for example, hydrogenated. Examples further include coumarone-indene resins. Of these resins, styrene resins may be preferably used from the points of view of compatibility, heat resistance and discoloration resistance.

The tackifier resins may be used singly, or two or more may be used in combination. The combined use of two or more tackifier resins is advantageous in that an excellent balance between bond strength and tackiness is obtained. To ensure that high bond strength is obtained, the tackifier resin is preferably one having a softening point of 50 to 160° C.

The components for forming the base portion of the structural body of the present invention may include additional polymers and additives other than tackifier resins such as softeners, plasticizers, heat stabilizers, light stabilizers, antistatic agents, flame retardants, foaming agents, colorants, dyes, refractive index modifiers, fillers, curing agents, lubricants, antiblocking agents, ant repellents and rodent repellents while ensuring that the advantageous effects of the present invention are not impaired. These additional polymers and additives may be used singly, or two or more may be used in combination.

Examples of the additional polymers include acrylic resins such as polymethyl methacrylate, and (meth)acrylic acid ester polymers and copolymers; olefin resins such as polyethylene, ethylene-vinyl acetate copolymer, polypropylene, polybutene-1, poly-4-methylpentene-1 and polynorbornene; ethylene ionomers; styrene resins such as polystyrene, styrene-maleic anhydride copolymer, high-impact polystyrene, AS resins, ABS resins, AES resins, AAS resins, ACS resins and MBS resins; styrene-methyl methacrylate copolymer; styrene-methyl methacrylate-maleic anhydride copolymer; polyester resins such as polyethylene terephthalate, polybutylene terephthalate and polylactic acid; polyamides such as nylon 6, nylon 66 and polyamide elastomers; polycarbonates; polyvinyl chloride; polyvinylidene chloride; polyvinyl alcohols; ethylene-vinyl alcohol copolymers; polyacetals; polyvinylidene fluoride; polyurethanes; modified polyphenylene ethers; polyphenylene sulfide; silicone rubber-modified resins; acrylic rubbers; silicone rubbers; styrenic thermoplastic elastomers such as SEPS, SEBS and SIS; and olefin rubbers such as IR, EPR and EPDM. Of these, from the point of view of the compatibility with the acrylic triblock copolymer (I) among the components for forming the base portion of the structural body, polymethyl methacrylate, (meth)acrylic acid ester polymers and copolymers, ethylene-vinyl acetate copolymer, AS resins, styrene-methyl methacrylate-maleic anhydride copolymer, polylactic acid and polyvinylidene fluoride are preferable, and polymethyl methacrylate, (meth)acrylic acid ester copolymers and styrene-methyl methacrylate-maleic anhydride copolymer are still more preferable.

Examples of the (meth)acrylic acid ester polymers and copolymers include polymethyl acrylate, poly-n-butyl acrylate, poly-2-ethylhexyl acrylate, random copolymer of methyl methacrylate and methyl acrylate, and random copolymer of methyl methacrylate and n-butyl acrylate.

The components for forming the base portion of the structural body which include the acrylic triblock copolymer (I) may be blended by any method without limitation. For example, the blend may be produced by mixing the components with use of a known mixing or kneading machine such as a kneader ruder, an extruder, a mixing roll or a Banbury mixer at a temperature in the range of 100 to 250° C. Alternatively, the blend may be produced by mixing the components in a solution in an organic solvent and thereafter distilling off the organic solvent. Particularly preferably, the components are melt-kneaded with a twin-screw extruder at a temperature in the range of 150 to 240° C., and the kneaded product is extruded and cut into a shape such as pellets.

The structural body may be produced by any method without limitation as long as the structural body that is fabricated includes a base portion including the acrylic triblock copolymer (I), and through holes. Some example methods are described below.

(1) A blend including the acrylic triblock copolymer (I) is melt-extruded to form long fibers. An aggregate of short fibers is prepared from the long fibers, and the short fibers in the aggregate are compression bonded to one another with an adhesive or by heat to form a structural body.

(2) A melt of a blend including the acrylic triblock copolymer (I) is melt-blown to form a structural body.

(3) A melt of a blend including the acrylic triblock copolymer (I) is applied onto a plate which has a patterning layer having recesses and bumps, or the blend is melted on such a plate. Thereafter, the resultant product including a base portion and through holes is peeled from the plate to give a structural body (pattern printing method).

Among those methods described above, the pattern printing method is preferably adopted to fabricate the structural body of the present invention for reasons such as that the base portion of the perforated structural body can be easily fabricated with the desired shape by selecting the shape of the recesses correspondingly to the desired shape of the base portion.

The laminate of the present invention includes a substrate and the above-described structural body including a base portion and through holes that is disposed on the surface of at least one side of the substrate.

Examples of the configurations of the laminates include two-layered laminates composed of the above-described structural body including a base portion and through holes/a substrate; three-layered laminates composed of the above-described structural body including a base portion and through holes/a substrate/the above-described structural body including a base portion and through holes; four-layered laminates composed of the above-described structural body including a base portion and through holes/a substrate/the above-described structural body including a base portion and through holes/a substrate; five-layered laminates composed of the above-described structural body including a base portion and through holes/a substrate/the above-described structural body including a base portion and through holes/a substrate/the above-described structural body including a base portion and through holes; and three-layered laminates composed of a substrate/the above-described structural body including a base portion and through holes/a substrate.

When the structural body including a base portion and through holes defines the outermost layer in the laminate of the present invention, a release layer such as, for example, polyethylene, a polypropylene film, a release-treated PET film or release paper may be provided on the outer side of the structural body.

Examples of the substrates used in the laminates include paper, resin sheets or films, and woven or nonwoven fabrics made of fibrous materials. Examples of the thermoplastic polymers used as materials for the resin sheets or films or used as the fibrous materials include polyesters, polyamides, acrylic resins, polyurethanes, polyethylenes, polypropylenes, and vinyl chloride resins such as polyvinyl chloride. The fibrous materials may be prepared from these thermoplastic polymer materials by, for example, melt-spinning of the thermoplastic polymer materials. The resin sheets or films may be prepared from these thermoplastic polymer materials by, for example, melt-extrusion of the thermoplastic polymer materials.

Examples of the fibrous materials further include natural fibers such as cotton, hemp, silk and wool; and inorganic fibers such as glass fibers and carbon fibers. By the weaving of these fibrous materials, woven fabrics such as textiles and knitted fabrics may be produced. Further, the fibrous materials may be formed into nonwoven fabrics by a mechanical method, a chemical method or a combination of such methods.

The laminate of the present invention may be obtained by stacking, on the substrate, the structural body obtained as described above which includes a base portion and through holes. The stacking methods are not particularly limited as long as the laminates of the present invention can be obtained. Some example methods are described below.

(1) A structural body including a base portion and through holes is compression bonded to a substrate with an adhesive or by heat to form a laminate.

(2) A material for forming a base portion is directly melt-blown onto a substrate by the melt-blowing method described hereinabove to form a laminate.

(3) A melt of a blend including the acrylic triblock copolymer (I) is applied onto a plate which has a patterning layer having recesses and bumps, or the blend is melted on such a plate. Thereafter, the resultant product including a base portion and through holes is peeled from the plate and is transferred in the molten state onto a substrate to form a laminate.

Among those methods described above, the method (3) in which a laminate is produced by pattern printing is preferable for reasons such as that a laminate which includes a structural body of desired shape can be easily fabricated.

The laminates of the present invention may be used in various applications. Specific examples of such applications include adhesive tapes, films and sheets for surface protection, masking, wrapping/packaging, office uses, labels, decoration/display, book binding, dicing tapes, medical/sanitary uses, laminated glasses, prevention of glass scattering, electrical insulation, holding and fixing of electronic equipment, production of semiconductors, optical display films, adhesive optical films, shielding of electromagnetic waves, and sealing materials for electric and electronic parts, and also include medical materials, filter materials, food packaging materials, housing materials, kitchen materials, and apparel materials.

The adhesive tapes, films and sheets for surface protection may be used for various materials such as metals, plastics, rubbers and wood, and specifically may be used for the surface protection of coating surfaces, metals during plastic working or deep drawing, automobile parts and optical parts. Examples of the automobile parts include coated exterior plates, wheels, mirrors, windows, lights and light covers. Examples of the optical parts include various image display devices such as liquid crystal displays, organic EL displays, plasma displays and field emission displays; optical disk constitutional films such as polarizing films, polarizing plates, retardation plates, light guide panels, diffusion plates and DVD; and fine coat faceplates for electronic/optical uses.

Exemplary uses for masking applications include masking during the manufacturing of printed wiring boards or flexible printed wiring boards; masking during a plating or soldering treatment for electronic equipment; and masking during the manufacturing of vehicles such as automobiles, during the coating of vehicles and buildings, during textile printing, and during trimming of civil engineering works.

Exemplary uses for wrapping applications include heavy material packaging, packaging for export, sealing of corrugated fiberboard boxes and sealing of cans. Examples of office uses include general use for office, and uses for sealing, mending of books, drawing and memos. Exemplary uses for label applications include price displays, merchandise displays, tags, POP, stickers, stripes, nameplates, decoration and advertisement.

Exemplary uses for label applications include labels having such substrate layers as, for example, papers such as paper, converted paper (paper subjected to aluminum deposition, aluminum lamination, varnishing, resin treatment or the like) and synthetic paper; and films made of cellophane, plastic materials, fabrics, wood or metals.

Examples of the substrate layers include woodfree paper, art paper, cast-coated paper, thermal paper, foil paper, polyethylene terephthalate film, polyvinyl chloride film, OPP film, polylactic acid film, synthetic paper, thermal synthetic paper and overlaminate film.

Some example adherends for the labels include plastic products such as plastic bottles and foamed plastic cases; paper or corrugated fiberboard products such as corrugated fiberboard boxes; glass products such as glass bottles; metal products; and products made of other inorganic materials such as ceramics.

Exemplary uses for decoration/display applications include danger display seals, line tapes, wiring markings, after-glow luminous adhesive tapes and reflecting sheets.

Examples of the applications as adhesive optical films include adhesive layers formed on at least part or the entirety of one or both sides of such optical films as polarizing films, polarizing plates, retardation films, viewing angle enlarging films, luminance improving films, antireflection films, antiglare films, color filters, light guide panels, diffusion films, prism sheets, electromagnetic wave shielding films, near infrared absorbing films, functional composite optical films, films for ITO lamination, impact resistance imparting films, and visibility improving films. The adhesive optical films may be protective films used for the protection of the surface of the above optical films. The adhesive optical films are suitably used in various image display devices such as liquid crystal display devices, PDP, organic EL display devices, electronic papers, game machines and mobile terminals.

Exemplary uses for electrical insulation applications include protective covering or insulation for coils, and layer insulation such as motor/transformer layer insulation. Exemplary uses for holding and fixing of electronic equipment include carrier tapes, packaging, fixing of cathode ray tubes, splicing and rib reinforcement. Exemplary uses for the production of semiconductors include protection of silicon wafers.

Examples of the medical and sanitary uses include uses for percutaneous drugs such as analgesic anti-inflammatory agents (plasters, poultices), plasters for cold, antipruritic patches and keratin softening agents; uses for various tapes such as first-aid plasters (containing germicides), surgical dressings/surgical tapes, plasters, hemostatic tapes, tapes for human waste disposal devices (artificial anus fixing tapes), tapes for stitching, antibacterial tapes, fixing tapings, self-adhesive bandages, adhesive tapes for oral mucosa, tapes for sporting, and depilatory tapes; uses for beauty such as facial packs, moistening sheets for skin round the eyes and keratin peel packs; binding uses in sanitary materials such as diapers and sheets for pets; cooling sheets, disposable body warmers, and uses for dust proofing, waterproofing and noxious insect capture.

Exemplary uses as sealing materials for electronic/electric parts include sealing materials for liquid crystal displays, organic EL displays, organic EL lights, solar cells and the like.

Examples of the laminated glass applications include automobile windshields, automobile side glasses, automobile sunroofs, automobile rear glasses and head-up display glasses.

Examples of the medical materials include diaper members, sanitary napkin members, members of surgical gowns, medical scrubs, patient scrubs and screening scrubs, members of covering cloths, gowns and drapes, supporter members, sterilization bag members, pregnancy/postpartum pads, breast pads, cap members, mask members, bed sheet members, antibacterial mats, wound care products, drug absorbers and blood absorbers.

Examples of the filter materials include dehumidifying filters, dust collecting filters, air filters, HEPA filters, liquid cartridge filters, automobile engine air cleaners, virus/bacteria removing filters and dry cleaning filters.

Examples of the food packaging materials include tray liners, towels, kitchen cloths, paper towels, dehumidifying materials, antibacterial sheets and mesh Caps.

Examples of the housing materials include desk mats, table mats, table cloths, table decorations, transparent films, place mats, window films, window decorative sheets, window laces, bath curtains, cafe curtains, curtain liners, cushion floors, floor cloths, floor sheets, joint mats, anti-slip sheets, anti-slip sheets between floor materials and leveling materials, anti-slip sheets between floor materials and mortars, wall decorative sheets, decorative sheets, sitting chairs, Japanese kotatsu blankets, panel doors, pet mats, claw scratch protection sheets, pet slopes, rug covers, moisture-permeable waterproof sheets, weather shades, awnings, balcony decorative members, and soil covering materials such as house wraps and roofing.

Examples of the kitchen materials include kitchen cabinet sheets, refrigerator sheets, mesh cloths and kitchen sheets.

Examples of the apparel materials include headgears, cold weather apparels, underwear (such as shirts, briefs, belly bands, half-long pants, patches, shorts, girdles, petticoats, leggings, socks and tights), and sweat-absorbing sheets and sweat-permeable sheets used in sports apparels, casual apparels and the like.

EXAMPLES

The present invention will be described in greater detail hereinbelow based on Examples, Comparative Examples and other experiments. However, it should be construed that the scope of the present invention is not limited to such examples. In Production Examples 1 to 6 described later, monomers and other compounds were used after being dried and purified by conventional methods and degassed with nitrogen. Further, the monomers and other compounds were transferred and supplied to the reaction system in a nitrogen atmosphere.

The weight average molecular weight (Mw) and number average molecular weight (Mn) of polymers, block copolymers and random copolymers obtained in examples described later were determined as polystyrene-equivalent molecular weights by GPC. The molecular weight distribution (Mw/Mn) was calculated from these molecular weights. The measurement device and conditions used in GPC are as follows.

[GPC Measurement Device and Conditions]
Device: GPC device "HLC-8020" manufactured by TOSOH CORPORATION.
Separation columns: "TSKgel GMHXL", "G4000HXL" and "G5000HXL" manufactured by TOSOH CORPORATION were connected in series.
Eluent: Tetrahydrofuran.
Eluent flow rate: 1.0 ml/min.
Column temperature: 40° C.
Detection method: Differential refractive index (RI).

In the examples described later, the contents of polymer blocks in block copolymers were determined by $^1$H-NMR measurement. The measurement device and conditions used in $^1$H-NMR measurement are as follows.

[$^1$H-NMR Measurement Device and Conditions]
Device: Nuclear magnetic resonance apparatus "JNM-LA400" manufactured by JEOL Ltd.
Deuterated solvent: Deuterated chloroform.

In a $^1$H-NMR spectrum, signals near 3.6 ppm and 4.0 ppm are assigned to the ester group (—O—C$\underline{H}_3$) in a methyl methacrylate unit and to the ester group (—O—C$\underline{H}_2$—CH$_2$—CH$_2$—CH$_3$ or —O—C$\underline{H}_2$—CH(—CH$_2$—C$\underline{H}_3$)—CH$_2$—CH$_2$—CH$_2$—CH$_3$) in an acrylic acid ester unit, respectively. The contents of the respective polymer blocks were obtained from the ratio of the integrals of these signals. In a $^1$H-NMR spectrum of a monomer mixture used for the polymerization of a polymer block (B), signals near 4.0 ppm and 4.1 ppm are assigned to the ester group (—O—C$\underline{H}_2$—CH$_2$—CH$_2$—CH$_3$) in n-butyl acrylate and to the ester group (—O—C$\underline{H}_2$—CH(—CH$_2$—CH$_3$)—CH$_2$—CH$_2$—CH$_2$—CH$_3$) in 2-ethylhexyl acrylate, respectively. The contents of the respective monomers were expressed as the molar ratio from the integral ratio of these signals, and the molar ratio was converted to a mass ratio based on the molecular weights of the respective monomer units. The mass ratio of the monomers constituting the polymer block (B) was thus determined.

[Breathability 1]

Acrylic triblock copolymers of Production Examples 1 to 4, and blends of Blend Examples 1 to 10 were each formed into a 100 μm thick flat layer and transferred in the molten state to one side of a 95 μm thick polyester nonwoven fabric (15TH-36 manufactured by HIROSE PAPER MFG CO., LTD.) as a substrate by a known printing method. Thus, laminates having an unperforated structural body were fabricated. The breathability of the acrylic triblock copolymers themselves and of the blends themselves was evaluated by measurement in accordance with JIS Z0208 (method B) in an atmosphere at 40° C. and 90% RH.

[Breathability 2]

Laminates obtained in Examples 1 to 16 and 24 to 26 and Comparative Examples 1, 3, 4 and 9, which each included an unperforated substrate and a structural body including a base portion and through holes (or an unperforated structural body), were cut into a width of 10 mm and a length of 100 mm. The cutout pieces were each applied onto a wooden board that had been stored in a humidity conditioned environment at 40° C. and 90% RH, and humidified air at 40° C. and 90% RH was supplied from the lower side of the wooden board. Breathability 2 was judged by sensibility evaluation of adhesion based on two criteria. The laminates of Examples 24 to 26 and Comparative Example 9 had structural bodies on both sides thereof. Prior to the evaluation of Breathability 2 of these laminates in the aforementioned manner, the surface of the structural body on one side was covered with a PET film and thereafter the structural body on the other side was applied to a wooden board.

1. Lifting occurred partially.
2. No lifting and no separation.

[Breathability 3]

Laminates obtained in Examples 17 to 23 and Comparative Examples 5, 7 and 8, which each included a nonwoven fabric substrate and a structural body including a base portion and through holes, were applied to the body, and the wetness caused by perspiration was evaluated by sensory testing based on three criteria.

1. The laminate was significantly wet with perspiration and became wrinkled.
2. The laminate was wet with perspiration but was not wrinkled.
3. The laminate was dry without wetness.

[Adhesive Residue]

A laminate obtained was cut into a width of 10 mm and a length of 100 mm. The cutout pieces of the laminate were applied to a glass plate through the structural body and a 2 kg roller was moved back and forth two times to press the laminate against the glass plate. Evaluation samples were thus fabricated. After the evaluation samples were allowed to stand at room temperature or 70° C. for 24 hours, the laminates were peeled off and the glass surface was visually inspected. The adhesive residue was evaluated as "absent" when there was no adhesive or other residue and the adherend (the glass plate) was free from contamination, and was evaluated as "present" when the adherend had been contaminated with adhesive or other residue.

[Weight Saving]

In a structural body including a base portion and through holes, the proportion of the through holes was calculated as the void content. When the void content was 50% or more, weight saving was judged as satisfactory and was rated as "○". When the void content was less than 50%, weight saving was judged as unsatisfactory and was rated as "Δ".

[Releasability]

In Examples 1 to 23 and Comparative Examples 1 to 8, two test pieces having a width of 10 mm and a length of 100 mm were cut out from the laminate, and the test pieces were attached to each other so that the adhesive layers (the structural bodies) were in contact with each other. A 2 kg roller was moved back and forth two times to press the test pieces against each other. Thereafter, the test pieces were manually peeled off from each other and the state of the adhesive layers was examined. The releasability was evaluated as "A" when there was no lifting from the substrate and was rated as "B" when any lifting was found.

The laminates of Examples 24 to 26 and Comparative Example 9 had adhesive layers (structural bodies) on both sides thereof. Thus, the releasability of these laminates was evaluated as follows. Two test pieces having a width of 10 mm and a length of 100 mm were cut out from the laminate. The surface of the adhesive layers (the structural bodies) on one side was covered with a PET film, and thereafter the test pieces were attached to each other so that the adhesive layers (the structural bodies) on the other side were in contact with each other. The unit was then tested in the similar manner as described above to evaluate the releasability.

[Applicability 1]

Laminates obtained in Examples 1 to 23 and Comparative Examples 1 to 8 were each cut to give a test piece having a width of 200 mm and a length of 300 mm. The test pieces were applied to a glass plate through a structural body including a base portion and through holes, and the applicability during this process was evaluated. The applicability was evaluated as "A" when the laminate was applied clean with no or little wrinkles or air traps, and was rated as "B" when the laminate was wrinkled or captured air and remained as such even after the application.

[Applicability 2]

Laminates obtained in Examples 24 to 26 and Comparative Example 9 were each cut to give a test piece having a width of 1000 mm and a length of 1000 mm. A mortar plate (width: 1000 mm, length: 1000 mm, thickness: 10 mm) was applied to a structural body (structural body 1) on one side of the test piece, and a vinyl floor sheet (width: 1000 mm, length: 1000 mm, thickness: 10 mm) was applied to a structural body (structural body 2) on the other side of the test piece. A multilayer product consisting of mortar plate/laminate/vinyl floor sheet was thus prepared. The applicability during this process was evaluated. The applicability was evaluated as "A" when the layers were applied clean with no or little wrinkles or air traps, and was rated as "B" when wrinkles or air traps were formed and remained as such even after the application.

[Applicability 3]

A multilayer product consisting of leveled concrete plate/laminate/vinyl floor sheet was prepared in the same manner as described in the testing of Applicability 2, except that the mortar plate (width: 1000 mm, length: 1000 mm, thickness: 10 mm) was replaced by a concrete plate (width: 1000 mm, length: 1000 mm, thickness: 10 mm) that had been surface-treated with a leveling material (product name: "Floor Leveler G" manufactured by UBE Construction Materials Co., Ltd.) and that the treated surface of the concrete plate was applied to one side of the test piece.

The applicability during this process was evaluated. The applicability was evaluated as "A" when the layers were applied clean with no or little wrinkles or air traps, and was rated as "B" when wrinkles or air traps were formed and remained as such even after the application.

[Adherend Contamination]

With respect to the multilayer product consisting of mortar plate/laminate/vinyl floor sheet, and the multilayer product consisting of leveled concrete plate/laminate/vinyl floor sheet which were prepared for the evaluation of Applicability 2 and Applicability 3, a load corresponding to a body weight of 90 kg was applied on the vinyl floor sheet side using a single-wheel rolling caster and the caster was rolled 2000 times in random directions. Thereafter, the vinyl floor sheet and the mortar plate or the leveled concrete plate were removed from the multilayer products, and the surfaces of the mortar plate, the concrete plate and the vinyl floor sheet were visually inspected. The adhesive residue was evaluated as "absent" when there was no adhesive or other residue and the adherends (the mortar plate, the leveled concrete plate and the vinyl floor sheet) were free from contamination, and was evaluated as "present" when contamination or other defects were found.

<<Production Example 1>> [Production of Acrylic Triblock Copolymer (I-1)]

(1) A 3 L three-necked flask was equipped with a three-way cock and was purged with nitrogen. While performing stirring at room temperature, the flask was loaded with 1302 g of toluene and 65.1 g of 1,2-dimethoxyethane, subsequently loaded with 120.0 g of a toluene solution containing 60.3 mmol of isobutylbis(2,6-di-t-butyl-4-methylphenoxy) aluminum, and further loaded with 4.34 g of a sec-butyllithium in cyclohexane solution containing 7.50 mmol of sec-butyllithium.

(2) Subsequently, 53.9 g of methyl methacrylate was added at room temperature while performing stirring, and the mixture was continuously stirred for 60 minutes. The reaction liquid was yellow at first and became colorless after the 60 minutes of stirring.

(3) Thereafter, the internal temperature of the polymerization liquid was cooled to −30° C., and 360 g of n-butyl acrylate was added dropwise over a period of 2 hours while performing stirring. After the completion of the dropwise addition, stirring was continued at −30° C. for another 5 minutes.

(4) Thereafter, 53.9 g of methyl methacrylate was added, and the mixture was stirred at room temperature overnight.

(5) The polymerization reaction was terminated by the addition of 20 g of methanol, and the reaction liquid obtained was poured into 15 kg of methanol while performing stirring to precipitate a white deposit. The resultant white deposit was recovered and was dried to give 440 g of an acrylic triblock copolymer (I-1). The acrylic triblock copolymer (I-1) thus obtained was analyzed by GPC in accordance with the process described hereinabove to determine the weight average molecular weight (Mw) and the number average molecular weight (Mn), from which (Mw/Mn) was calculated. Further, the total content of the polymer blocks composed of methyl methacrylate units in the acrylic triblock copolymer (I-1) was determined by the $^1$H-NMR measurement described hereinabove. The properties of the acrylic triblock copolymer (I-1) are described in Table 1.

<<Production Example 2>> [Production of Acrylic Triblock Copolymer (1-2)]

(1) A 3 L three-necked flask was equipped with a three-way cock and was purged with nitrogen. While performing stirring at room temperature, the flask was loaded with 1409 g of toluene and 32.7 g of 1,2-dimethoxyethane, subsequently loaded with 48.6 g of a toluene solution containing 24.5 mmol of isobutylbis(2,6-di-t-butyl-4-methylphenoxy) aluminum, and further loaded with 2.55 g of a sec-butyllithium in cyclohexane solution containing 4.35 mmol of sec-butyllithium.

(2) Subsequently, 43.5 g of methyl methacrylate was added at room temperature while performing stirring, and the mixture was continuously stirred for 60 minutes. The reaction liquid was yellow at first and became colorless after the 60 minutes of stirring.

(3) Thereafter, the internal temperature of the polymerization liquid was cooled to −30° C., and 360 g of n-butyl acrylate was added dropwise over a period of 2 hours while performing stirring. After the completion of the dropwise addition, stirring was continued at −30° C. for another 5 minutes.

(4) Thereafter, 61.5 g of methyl methacrylate was added, and the mixture was stirred at room temperature overnight.

(5) The polymerization reaction was terminated by the addition of 15 g of methanol, and the reaction liquid obtained was poured into 15 kg of methanol while performing stirring to precipitate a white deposit. The resultant white deposit was recovered and was dried to give 450 g of an acrylic triblock copolymer (I-2). The acrylic triblock copolymer (I-2) thus obtained was analyzed by GPC in accordance with the process described hereinabove to determine the weight average molecular weight (Mw) and the number average molecular weight (Mn), from which (Mw/Mn) was calculated. Further, the total content of the polymer blocks composed of methyl methacrylate units in the acrylic triblock copolymer (I-2) was determined by the $^1$H-NMR measurement described hereinabove. The properties of the acrylic triblock copolymer (1-2) are described in Table 1.

<<Production Example 3>> [Production of Acrylic Triblock Copolymer (I-3)]

(1) A 3 L three-necked flask was equipped with a three-way cock and was purged with nitrogen. While performing stirring at room temperature, the flask was loaded with 1409 g of toluene and 32.7 g of 1,2-dimethoxyethane, subsequently loaded with 48.6 g of a toluene solution containing 24.5 mmol of isobutylbis(2,6-di-t-butyl-4-methylphenoxy) aluminum, and further loaded with 1.85 g of a sec-butyllithium in cyclohexane solution containing 3.15 mmol of sec-butyllithium.

(2) Subsequently, 32.6 g of methyl methacrylate was added at room temperature while performing stirring, and the mixture was continuously stirred for 60 minutes. The reaction liquid was yellow at first and became colorless after the 60 minutes of stirring.

(3) Thereafter, the internal temperature of the polymerization liquid was cooled to −30° C., and 410 g of n-butyl acrylate was added dropwise over a period of 2 hours while performing stirring. After the completion of the dropwise addition, stirring was continued at −30° C. for another 5 minutes.

(4) Thereafter, 45.3 g of methyl methacrylate was added, and the mixture was stirred at room temperature overnight.

(5) The polymerization reaction was terminated by the addition of 15 g of methanol, and the reaction liquid obtained was poured into 15 kg of methanol while performing stirring to precipitate a white deposit. The resultant white deposit was recovered and was dried to give 445 g of an acrylic triblock copolymer (I-3). The acrylic triblock copolymer (I-3) thus obtained was analyzed by GPC in accordance with the process described hereinabove to determine the weight average molecular weight (Mw) and the number average molecular weight (Mn), from which (Mw/Mn) was calculated. Further, the total content of the polymer blocks composed of methyl methacrylate units in the acrylic triblock copolymer (I-3) was determined by the $^1$H-NMR measurement described hereinabove. The properties of the acrylic triblock copolymer (I-3) are described in Table 1.

<<Production Example 4>> [Production of Acrylic Triblock Copolymer (I-4)]

(1) A 3 L three-necked flask was equipped with a three-way cock and was purged with nitrogen. While performing stirring at room temperature, the flask was loaded with 1038 g of toluene and 43.5 g of 1,2-dimethoxyethane, subsequently loaded with 37.4 g of a toluene solution containing 18.8 mmol of isobutylbis(2,6-di-t-butyl-4-methylphenoxy) aluminum, and further loaded with 2.90 g of a sec-butyllithium in cyclohexane solution containing 4.95 mmol of sec-butyllithium.

(2) Subsequently, 25.4 g of methyl methacrylate was added at room temperature while performing stirring, and the mixture was continuously stirred for 60 minutes. The reaction liquid was yellow at first and became colorless after the 60 minutes of stirring.

(3) Thereafter, the internal temperature of the polymerization liquid was cooled to −30° C., and 215 g of a mixture containing n-butyl acrylate and 2-ethylhexyl acrylate (50/50 by mass) was added dropwise over a period of 2 hours while performing stirring. After the completion of the dropwise addition, stirring was continued at −30° C. for another 5 minutes.

(4) Thereafter, 29.4 g of methyl methacrylate was added, and the mixture was stirred at room temperature overnight.

(5) The polymerization reaction was terminated by the addition of 15 g of methanol, and the reaction liquid obtained was poured into 15 kg of methanol while performing stirring to precipitate a white deposit. The resultant white deposit was recovered and was dried to give 250 g of an acrylic triblock copolymer (I-4). The acrylic triblock copolymer (I-4) thus obtained was analyzed by GPC in accordance with the process described hereinabove to determine the weight average molecular weight (Mw) and the number average molecular weight (Mn), from which (Mw/Mn) was calculated. Further, the total content of the polymer blocks composed of methyl methacrylate units, and the n-butyl acrylate/2-ethylhexyl acrylate mass ratio in the acrylic triblock copolymer (I-4) were determined by the $^1$H-NMR measurement described hereinabove. The properties of the acrylic triblock copolymer (I-4) are described in Table 1.

<<Production Example 5>> [Production of Styrenic Triblock Copolymer]

A pressure vessel equipped with a stirrer was loaded with 23 kg of cyclohexane and 99 ml of sec-butyllithium (11 mass %, cyclohexane solution), and 467 g of styrene was added to this solution over a period of 30 minutes. Polymerization was performed at 50° C. for 30 minutes. Subsequently, 6380 g of isoprene was added over a period of 60 minutes, and polymerization was carried out at 50° C. for 90 minutes. Thereafter, 467 g of styrene was added over a period of 30 minutes, and polymerization was performed at 50° C. for 30 minutes. A reaction mixture liquid was thus obtained which included a polystyrene-polyisoprene-polystyrene triblock copolymer (hereinafter, referred to as the styrenic triblock copolymer (A-1)). The weight average molecular weight of the styrenic triblock copolymer (A-1) was 95000, and the styrene content measured by $^1$H-NMR was 18 mass %.

To the reaction mixture liquid including the styrenic triblock copolymer (A-1) was added a hydrogenation catalyst which had been prepared separately by adding 460 g of triisopropylaluminum (20 mass %, cyclohexane solution) to 90 g of nickel octylate (64 mass %, cyclohexane solution). Hydrogenation reaction was carried out in a hydrogen atmosphere at 80° C. and 1 MPa to produce a hydrogenated product of the polystyrene-polyisoprene-polystyrene triblock copolymer (hereinafter, this hydrogenated product will be referred to as the styrenic triblock copolymer (I'-1)). The weight average molecular weight of the styrenic triblock copolymer (I'-1) was 102000, and the styrene content and the hydrogenation ratio measured by $^1$H-NMR were 17 mass % and 99%, respectively.

<<Production Example 6>> [Synthesis of Acrylic Random Copolymer (B)]

In a four-necked flask that had been purged with nitrogen, 96 parts by mass of n-butyl acrylate and 4 parts by mass of acrylic acid were copolymerized in 30 parts by mass of a 50:50 solvent consisting of ethyl acetate and toluene. Thus, a solution of an acrylic random copolymer (B) having a weight average molecular weight (Mw) of 550,000 was obtained. Ethyl acetate was added to the solution to adjust the concentration of the acrylic random copolymer (B) in the solution to 30 wt %.

Table 1 describes the block structures, the weight average molecular weights (Mw), the molecular weight distributions (Mw/Mn), the total contents of the PMMA polymer blocks (the polymer blocks composed of 100 mass % of methyl methacrylate units) constituting the polymer blocks (A), the constituent components of the polymer block (B) and the mass ratio in the polymer block (B), of the acrylic triblock copolymers (I-1) to (I-4) obtained in Production Examples 1 to 4. In Table 1, PMMA indicates a polymer block composed of 100 mass % of methyl methacrylate units, PnBA a block composed of 100 mass % of n-butyl acrylate units, and PnBA/P2EHA a block consisting solely of butyl acrylate units and 2-ethylhexyl acrylate units.

TABLE 1

| | Block structure | Weight average molecular weight Mw | Molecular weight distribution Mw/Mn | Total content (mass %) of polymer blocks (A1) and (A2) | Configuration (mass ratio) of polymer block (B) |
|---|---|---|---|---|---|
| I-1 | PMMA-PnBA-PMMA | 72000 | 1.09 | 23.4 | nBA/2EHA = 100/0 |
| I-2 | PMMA-PnBA-PMMA | 111000 | 1.09 | 22.5 | nBA/2EHA = 100/0 |
| I-3 | PMMA-PnBA-PMMA | 159000 | 1.10 | 16.3 | nBA/2EHA = 100/0 |
| I-4 | PMMA-(PnBA/P2EHA)-PMMA | 66400 | 1.10 | 20.0 | nBA/2EHA = 50/50 |

In Examples and Comparative Examples, the following were used as tackifier resins and plasticizer.
(Tackifier Resins)
Product name: "Foral 85E" manufactured by Eastman, hydrogenated rosin ester.
Product name: "Foral 105E" manufactured by Eastman, hydrogenated rosin ester.
Product name: "Ysertack 311" manufactured by Euro Yser, rosin ester.
Product name: "Ysertack 313" manufactured by Euro Yser, rosin ester.
Product name: "Pensel D125" manufactured by Arakawa Chemical Industries, Ltd., polymerized rosin ester.
Product name: "YS Resin SX100" manufactured by YASUHARA CHEMICAL CO., LTD., aromatic hydrocarbon resin.
Product name: "Kristalex F100" manufactured by Eastman, aromatic hydrocarbon resin.
Product name: "Arkon P-100" manufactured by Arakawa Chemical Industries, Ltd., polymerized alicyclic petroleum resin.
(Plasticizer)
Product name: "Diana Process PW-380" manufactured by Idemitsu Kosan Co., Ltd. (paraffin process oil).

Blend Examples 1 to 9 and 11

The acrylic triblock copolymers (I-1 to I-4) obtained in Production Examples 1 to 4 were each added to a kneader preset at 170° C. in accordance with the formulation described in Table 3, 4 or 6. After the copolymer had been uniformly melted, the temperature of the kneader was set to 155° C., and a tackifier resin was added in accordance with the formulation described in Table 3, 4 or 6. The mixture was melt-kneaded to give a uniform blend.

Blend Example 10

The styrenic triblock copolymer (I-5) obtained in Production Example 5 was added in a predetermined amount described in Table 4 to a kneader preset at 170° C. After the copolymer had been uniformly melted, the temperature of the kneader was set to 160° C., and a tackifier resin and a plasticizer were added in accordance with the formulation described in Table 4. The mixture was melt-kneaded to give a uniform blend.

<<Example 1>> [Production of Laminate (II-1) Having Substrate, and Structural Body Including Base Portion and Through Holes]

By a known pattern printing method, the acrylic triblock copolymer (I-1) obtained in Production Example 1 was formed into a patterned layer which had recesses and bumps of Mesh Shape 1 (size of through holes: 800 µm in length and width, width of base portion: 300 µm, thickness: 100 µm) and was transferred in the molten state onto one side of a 100 µm thick polyvinyl chloride (PVC) substrate film (manufactured by AS ONE Corporation). Thus, a laminate was fabricated which included a substrate, and a structural body (basis weight: 58 g/m$^2$) including a base portion and through holes.

<<Examples 2 to 4>> [Production of Laminates (II-2 to II-4) Having Substrate, and Structural Body Including Base Portion and Through Holes]

Laminates which included a substrate, and a structural body including a base portion and through holes were fabricated in the same manner as in Example 1, except that the shape of the through holes was changed to Mesh Shapes 2 to 4 described in Table 2.

<<Example 5>> [Production of Laminate (II-5) Having Substrate, and Structural Body Including Base Portion and Through Holes]

A laminate which included a substrate, and a structural body including a base portion and through holes was fabricated in the same manner as in Example 1, except that the substrate was changed to a polyurethane (PU) substrate film (Higress DUS202 manufactured by Sheedom Co., Ltd., thickness: 100 µm) described in Table 2.

<<Examples 6 to 8>> [Production of Laminates (II-6 to II-8) Having Substrate, and Structural Body Including Base Portion and Through Holes]

Laminates which included a substrate, and a structural body including a base portion and through holes were fabricated in the same manner as in Example 1, except that the acrylic triblock copolymer (I-1) was changed to any of the acrylic triblock copolymers (I-2) to (I-4) obtained in Production Examples 2 to 4.

<<Examples 9 to 16>> [Production of Laminates (II-9 to II-16) Having Substrate, and Structural Body Including Base Portion and Through Holes]

Laminates which included a substrate, and a structural body including a base portion and through holes were fabricated in the same manner as in Example 1, except that the acrylic triblock copolymer (I-1) was changed to any of the blends from Blend Examples 1 to 8 described in Tables 3 and 4.

<<Example 17>> [Production of Laminate (II-17) Having Substrate, and Structural Body Including Base Portion and Through Holes]

A laminate which included a nonwoven fabric substrate, and a structural body including a base portion and through holes was fabricated in the same manner as in Example 1, except that the substrate was changed to a polyester nonwoven fabric (15TH-36 manufactured by HIROSE PAPER MFG CO., LTD., thickness: 95 µm) described in Table 5.

<<Example 18>> [Production of Laminate (II-18) Having Substrate, and Structural Body Including Base Portion and Through Holes]

A laminate which included a nonwoven fabric substrate, and a structural body including a base portion and through holes was fabricated in the same manner as in Example 17, except that the acrylic triblock copolymer (I-1) was changed to the acrylic triblock copolymer (I-2) obtained in Production Example 2.

<<Examples 19 to 23>> [Production of Laminates (II-19 to II-23) Having Substrate, and Structural Body Including Base Portion and Through Holes]

Laminates which included a nonwoven fabric substrate, and a structural body including a base portion and through holes were fabricated in the same manner as in Example 17, except that the acrylic triblock copolymer (I-1) was changed to any of the blends from Blend Examples 1 to 3, 5 and 7 described in Tables 3 and 4.

<<Example 24>> [Production of Laminate (II-24) Having Substrate, and Structural Bodies Including Base Portion and Through Holes]

By a known pattern printing method, the acrylic triblock copolymer (I-1) obtained in Production Example 1 was formed into a patterned layer which had recesses and bumps of Mesh Shape 4 (size of through holes: 800 µm in length and width, width of base portion: 300 µm, thickness: 100 µm) and was transferred in the molten state onto both sides of a polyvinyl chloride (PVC) substrate film (manufactured by AS ONE Corporation) having a thickness described in Table 7. Thus, a laminate was fabricated which included structural bodies (structural bodies 1 and 2) (basis weight: 58 g/m$^2$) including a base portion and through holes on both sides of a substrate.

<<Examples 25 and 26>> [Production of Laminates (II-25 and II-26) Having Substrate, and Structural Bodies Including Base Portion and Through Holes]

Laminates which included structural bodies including a base portion and through holes on both sides of a substrate were fabricated in the same manner as in Example 24, except that the polyvinyl chloride (PVC) substrate film and the mesh shape described in Table 7 were changed.

<<Comparative Example 1>> [Production of Laminate (III-1) Having Substrate and Unperforated Structural Body]

By a known printing method, the acrylic triblock copolymer (I-1) obtained in Production Example 1 was formed into a 100 µm thick flat layer (basis weight: 110 g/m$^2$) and was transferred in the molten state onto one side of a 100 µm thick PVC substrate film. Thus, a laminate which included a substrate and an unperforated structural body was fabricated.

<<Comparative Example 2>> [Production of Laminate (III-2) Having Substrate, and Structural Body Including Base Portion Formed of Acrylic Random Copolymer (B) and Through Holes]

With use of a bar coater, a solution of the acrylic random copolymer (B) obtained in Production Example 6 was applied onto a plate having a patterning layer with recesses and bumps of Mesh Shape 1 (size of through holes: 800 µm in length and width, width of base portion: 300 µm). After the solution had been applied, the wet film was dried with a hot air dryer at 100° C. for 3 minutes. An attempt was made to transfer the structural body thus obtained onto a 100 µm thick PVC substrate film by a known pattern printing method, but resulted in a failure.

<<Comparative Example 3>> [Production of Laminate (III-3) Having Substrate, and Structural Body Including Base Portion and Through Holes]

A laminate which included a substrate, and a structural body including a base portion and through holes was fabricated in the same manner as in Example 1, except that the acrylic triblock copolymer (I-1) was changed to the blend from Blend Example 10 described in Table 4.

<<Comparative Example 4>> [Production of Laminate (III-4) Having Substrate, and Structural Body Including Base Portion and Through Holes]

A laminate which included a substrate, and a structural body including a base portion and through holes was fabricated in the same manner as in Example 1, except that the acrylic triblock copolymer (1-1) was changed to the blend from Blend Example 9 described in Table 4.

<<Comparative Example 5>> [Production of Laminate (III-5) Having Substrate and Unperforated Structural Body]

A laminate which included a nonwoven fabric substrate and an unperforated structural body was fabricated in the same manner as in Comparative Example 1, except that the substrate was changed to a polyester nonwoven fabric (15TH-36 manufactured by HIROSE PAPER MFG CO., LTD., thickness: 95 µm) described in Table 6.

<<Comparative Example 6>> [Production of Laminate (III-6) Having Substrate, and Structural Body Including Base Portion Formed of Solvent-Based Acrylic Adhesive and Through Holes]

The procedures described in Comparative Example 2 were repeated, except that the substrate was changed to a polyester nonwoven fabric (15TH-36 manufactured by HIROSE PAPER MFG CO., LTD., thickness: 95 µm) described in Table 6. The film could not be transferred similarly to Comparative Example 2.

<<Comparative Example 7>> [Production of Laminate (III-7) Having Substrate, and Structural Body Including Base Portion and Through Holes]

A laminate which included a nonwoven fabric substrate, and a structural body including a base portion and through holes was fabricated in the same manner as in Example 17, except that the acrylic triblock copolymer (I-1) was changed to the blend from Blend Example 10 described in Table 4.

<<Comparative Example 8>> [Production of Laminate (III-8) Having Substrate, and Structural Body Including Base Portion and Through Holes]

A laminate which included a nonwoven fabric substrate, and a structural body including a base portion and through holes was fabricated in the same manner as in Comparative Example 4, except that the substrate was changed to a polyester nonwoven fabric (15TH-36 manufactured by HIROSE PAPER MFG CO., LTD., thickness: 95 µm) described in Table 6, and that the blend was changed to the blend from Blend Example 11 described in Table 6.

<<Comparative Example 9>> [Production of Laminate (III-9) Having Substrate and Unperforated Structural Bodies]

As described in Table 7, the acrylic triblock copolymer (I-1) obtained in Production Example 1 was formed into a 100 µm thick flat layer (basis weight: 110 g/m$^2$) and was transferred in the molten state onto both sides of a 100 μm thick PVC substrate film by a known printing method. Thus, a laminate which included unperforated structural bodies on both sides of a substrate was fabricated.

By the method for evaluating Breathability 1, the breathability was evaluated with respect to the polymers themselves and the compositions themselves forming the base portions of the structural bodies. High breathability of not less than 500 g/m$^2$·24 hr was achieved by the layers (each 100 μm thick) made of the acrylic triblock copolymers (I-1) to (I-4) themselves from Production Examples 1 to 4 and the blends themselves from Blend Examples 1 to 9 which are the materials for forming the base portions of the structural bodies of the present invention. In contrast, the layer (100 μm thick) made of the blend from Blend Example 10 exhibited a very poor breathability of 30 g/m$^2$·24 hr.

As shown by the results of Examples 1 to 16 (Tables 2 and 3), the laminates that included a polyvinyl chloride (PVC) or polyurethane (PU) substrate and a structural body including a base portion and through holes and satisfied the conditions of the present invention were rated as "2" in Breathability 2. By virtue of their high breathability, the laminates that included such a substrate and a structural body including such a base portion and through holes were scarcely influenced by humidified air and did not separate from the wooden boards. Further, the laminates did not leave any adhesive residue on the adherends after being left attached to the adherends for 24 hours at room temperature or 70° C., and their adhesive residues were evaluated as "absent". In the evaluation of their weight saving, all the structural bodies including a base portion and through holes had a void content of not less than 50%, and their weight saving was judged as satisfactory and was rated as "O". Further, the releasability of the adhesive layers (the structural bodies) from each other was evaluated and was rated as "A" without any defects such as lifting of the adhesive layer from the substrate. The laminates were applied clean to the glass plates with no or little wrinkles or air traps, and were rated as "A" in Applicability 1.

As shown by the results of Examples 17 to 23 (Table 5), the laminates that included a nonwoven fabric substrate and a structural body including a base portion and through holes and satisfied the conditions of the present invention were rated as "3" in Breathability 3, and were not wet with perspiration and were dry. Further, the laminates did not leave any adhesive residue on the adherends after being left attached to the adherends for 24 hours at room temperature or 70° C., and their adhesive residues were evaluated as "absent". In the evaluation of their weight saving, all the structural bodies including a base portion and through holes had a void content of not less than 50%, and their weight saving was judged as satisfactory and was rated as "O". Further, the releasability of the adhesive layers (the structural bodies) from each other was evaluated and was rated as "A" without any defects such as lifting of the adhesive layer from the substrate. The laminates were applied clean to the glass plates with no or little wrinkles or air traps, and were rated as "A" in Applicability 1.

As shown by the results of Examples 24 to 26 (Table 7), the laminates that included structural bodies including a base portion and through holes on both sides of a substrate and satisfied the conditions of the present invention were rated as "2" in Breathability 2. By virtue of their high breathability, the laminates that included a substrate and structural bodies including a base portion and through holes were scarcely influenced by humidified air and did not separate from the wooden boards. Further, the laminates did not leave any adhesive residue on the adherends after being left attached to the adherends for 24 hours at room temperature or 70° C., and their adhesive residues were evaluated as "absent". In the evaluation of their weight saving, all the structural bodies including a base portion and through holes had a void content of not less than 50%, and their weight saving was judged as satisfactory and was rated as "O". Further, the releasability of the adhesive layers (the structural bodies) from each other was evaluated and was rated as "A" without any defects such as lifting of the adhesive layer from the substrate. The laminates each formed a clean mortar plate/laminate/vinyl floor sheet multilayer product with no or little wrinkles or air traps, and were rated as "A" in Applicability 2. The laminates each formed a clean multilayer product consisting of leveled concrete plate/laminate/vinyl floor sheet with no or little wrinkles or air traps, and were rated as "A" in Applicability 3. The vinyl floor sheet, and the mortar plate or the leveled concrete plate were removed from the multilayer products, and the surfaces of the mortar plate, the leveled concrete plate and the vinyl floor sheet were visually inspected for contamination on the adherends. There was no adhesive or other residue, and the contamination was rated as "absent" on the adherends (the mortar plate, the leveled concrete plate and the vinyl floor sheet).

In contrast, as shown by the results of Comparative Example 1 (Table 4), the laminate which included a substrate and an unperforated structural body was rated as "1" in Breathability 2. Because of the absence of voids, the laminate was significantly influenced by humidified air and part of the structural body separated from the wooden board to cause lifting. The laminate did not leave any adhesive residue on the adherend after being left attached to the adherend for 24 hours at room temperature or 70° C., and its adhesive residue was evaluated as "absent". Because the structural body was free from through holes and thus no weight was saved, its weight saving was rated as "A". When the adhesive layers (the structural bodies) were released from each other, the adhesive layers slightly separated from the substrates to cause lifting due to the close contact between the adhesive layers over the entirety of the flat plane. Thus, the releasability was rated as "B". When applied to the glass plate, the laminate was wrinkled or captured air and remained as such even after the application, thus being rated as "B" in Applicability 1.

As shown by the results of Comparative Example 3 (Table 4), the laminate which included a PVC substrate and a structural body including a base portion and through holes and did not satisfy the conditions of the present invention was rated as "1" in Breathability 2. Although voids were present, the base portion of the perforated structural body was low in breathability and thus the structural body was significantly influenced by humidified air and partly separated from the wooden board to cause lifting. A slight amount of adhesive residue was found on the adherend after the laminate had been left attached to the adherend for 24 hours at room temperature or 70° C., partly because the structural body contained large amounts of a tackifier resin and a plasticizer. The adhesive residue was thus evaluated as "present". When the adhesive layers (the structural bodies) were released from each other, the adhesive layers slightly separated from the substrates to cause lifting. Thus, the releasability was rated as "B". The laminate was applied clean to the glass plate with no or little wrinkles or air traps, and was rated as "A" in Applicability 1.

The laminate of Comparative Example 4 included a PVC substrate and a structural body that included through holes and a base portion including an acrylic triblock copolymer and a large amount of a tackifier resin. This laminate did not satisfy the conditions of the present invention. As shown by the results (Table 4), Breathability 2 was evaluated as "2". By virtue of its high breathability, the laminate was scarcely influenced by humidified air and the structural body did not separate from the wooden board. A slight amount of adhesive residue was found on the adherend after the laminate had been left attached to the adherend for 24 hours at room temperature or 70° C., partly because the structural body contained a large amount of a tackifier resin. The adhesive residue was thus evaluated as "present". The laminate was applied clean to the glass plate with no or little wrinkles or air traps, and was rated as "A" in Applicability 1.

As shown by the results of Comparative Example 5 (Table 6), the laminate which included a nonwoven fabric substrate and an unperforated structural body was rated as "1" in Breathability 3. Because of the absence of voids, much wetness was generated between the structural body and the body and the laminate easily became wrinkled. Because the structural body was free from through holes and thus no weight was saved, its weight saving was rated as "A". When the adhesive layers (the structural bodies) were released from each other, the adhesive layers slightly separated from the substrates to cause lifting due to the close contact between the adhesive layers over the entirety of the flat plane. Thus, the releasability was rated as "B". When applied to the glass plate, the laminate was wrinkled or captured air and remained as such even after the application, thus being rated as "B" in Applicability 1.

As shown by the results of Comparative Example 7 (Table 6), the laminate which included a nonwoven fabric substrate and a structural body including a base portion and through holes and did not satisfy the conditions of the present invention was rated as "2" in Breathability 3. Although voids were present, the base portion of the perforated structural body was low in breathability and thus wetness was generated between the structural body and the body to a degree that the laminate did not become wrinkled. A slight amount of adhesive residue was found on the adherend after the laminate had been left attached to the adherend for 24 hours at room temperature or 70° C., partly because the structural body contained large amounts of a tackifier resin and a plasticizer. The adhesive residue was thus evaluated as "present". When the adhesive layers (the structural bodies) were released from each other, the adhesive layers slightly separated from the substrates to cause lifting. Thus, the releasability was rated as "B". The laminate was applied clean to the glass plate with no or little wrinkles or air traps, and was rated as "A" in Applicability 1.

The laminate of Comparative Example 8 included a nonwoven fabric substrate and a structural body that included through holes and a base portion including an acrylic triblock copolymer and a large amount of a tackifier resin. This laminate did not satisfy the conditions of the present invention. As shown by the results (Table 6), Breathability 3 was rated as "3", and the laminate was not wet with perspiration and was dry. A slight amount of adhesive residue was found on the adherend after the laminate had been left attached to the adherend for 24 hours at room temperature or 70° C., partly because the structural body contained a large amount of a tackifier resin. The adhesive residue was thus evaluated as "present". The laminate was applied clean to the glass plate with no or little wrinkles or air traps, and was rated as "A" in Applicability 1.

As shown by the results of Comparative Example 9 (Table 7), the laminate that included unperforated structural bodies on both sides of a substrate was rated as "1" in Breathability 2. Due to the absence of voids, the structural body was significantly influenced by humidified air and partly separated from the wooden board to cause lifting. Because the structural bodies were free from through holes and thus no weight was saved, their weight saving was rated as "A". When the adhesive layers (the structural bodies) were released from each other, the adhesive layers slightly separated from the substrates to cause lifting due to the close contact between the adhesive layers over the entirety of the flat plane. Thus, the releasability was rated as "B". When the laminate was formed into a mortar plate/laminate/vinyl floor sheet multilayer product, the laminate was wrinkled or captured air and remained as such even after the application, thus being rated as "B" in Applicability 2. Applicability 3 was rated as "B" similarly to Applicability 2. The vinyl floor sheet, and the mortar plate or the leveled concrete plate were removed from the multilayer products, and the surfaces of the mortar plate, the leveled concrete plate and the vinyl floor sheet were visually inspected for contamination on the adherends. There was a slight amount of adhesive or other residue stemming from the strong and tight contact between the layers over the entirety of the flat plane. Thus, the contamination was rated as "present" on the adherends (the mortar plate, the leveled concrete plate and the vinyl floor sheet).

The laminates of the present invention include a substrate and a structural body which includes a base portion and through holes wherein the base portion includes an acrylic triblock copolymer (I) and no tackifier resins or includes an acrylic triblock copolymer (I) and a tackifier resin in a predetermined mass ratio. From the foregoing, the laminates of the present invention have been shown to concurrently satisfy stickiness and releasability, leave no or little adhesive residue, and exhibit excellent applicability.

TABLE 2

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Prod. Ex./Blend Ex. | | Prod. Ex. 1 | Prod. Ex. 1 | Prod. Ex. 1 | Prod. Ex. 1 | Prod. Ex. 1 | Prod. Ex. 2 | Prod. Ex. 3 | Prod. Ex. 4 |
| Acrylic triblock copolymers | I-1 | 100 | 100 | 100 | 100 | 100 | | | |
| | I-2 | | | | | | 100 | | |
| | I-3 | | | | | | | 100 | |
| | I-4 | | | | | | | | 100 |
| Styrenic triblock copolymer | I'-1 | | | | | | | | |
| Tackifier resins | Foral 85E | | | | | | | | |
| | Foral 105E | | | | | | | | |
| | Ysertack 311 | | | | | | | | |
| | Ysertack 313 | | | | | | | | |

TABLE 2-continued

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
|  | Pensel D125 |  |  |  |  |  |  |  |  |
|  | YS Resin SX100 |  |  |  |  |  |  |  |  |
|  | Kristalex F100 |  |  |  |  |  |  |  |  |
|  | Arkon P-100 |  |  |  |  |  |  |  |  |
| Plasticizer | Diana Process PW-380 |  |  |  |  |  |  |  |  |
| Acrylic random copolymer (B) |  |  |  |  |  |  |  |  |  |
| Breathability 1 (g/m² · 24 hr, 100 μm) |  | 580 | 580 | 580 | 580 | 580 | 610 | 670 | 640 |
| Laminate evaluation | Through hole shape | Mesh Shape 1 | Mesh Shape 2 | Mesh Shape 3 | Mesh Shape 4 | Mesh Shape 1 | Mesh Shape 1 | Mesh Shape 1 | Mesh Shape 1 |
|  | Through hole size (μm) | 800 | 1000 | 500 | 800 | 800 | 800 | 800 | 800 |
|  | Base portion width (μm) | 300 | 200 | 200 | 300 | 300 | 300 | 300 | 300 |
|  | Thickness (μm) | 100 | 100 | 100 | 70 | 100 | 100 | 100 | 100 |
|  | Basis weight (g/m²) | 58 | 76 | 56 | 41 | 58 | 58 | 58 | 58 |
|  | Void content (%) | 53 | 69 | 51 | 53 | 53 | 53 | 53 | 53 |
|  | Configuration (fabricated or not) | ○ | ○ | ○ | ○ | ○ | ○ | ○ | ○ |
|  | Substrate (type) | PVC | PVC | PVC | PVC | PU | PVC | PVC | PVC |
|  | Thickness (μm) | 100 | 100 | 100 | 100 | 100 | 100 | 100 | 100 |
|  | Breathability 2 | 2 | 2 | 2 | 2 | 2 | 2 | 2 | 2 |
|  | Adhesive residue Room temperature | Absent | Absent | Absent | Absent | Absent | Absent | Absent | Absent |
|  | Adhesive residue 70° C., 24 h | Absent | Absent | Absent | Absent | Absent | Absent | Absent | Absent |
|  | Weight saving | ○ | ○ | ○ | ○ | ○ | ○ | ○ | ○ |
|  | Releasability | A | A | A | A | A | A | A | A |
|  | Applicability 1 | A | A | A | A | A | A | A | A |

TABLE 3

|  |  | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Prod. Ex./Blend Ex. |  | Blend Ex. 1 | Blend Ex. 2 | Blend Ex. 3 | Blend Ex. 4 | Blend Ex. 5 | Blend Ex. 6 | Blend Ex. 7 | Blend Ex. 8 |
| Acrylic triblock copolymers | I-1 | 100 | 100 |  |  |  |  | 100 |  |
|  | I-2 |  |  | 100 | 100 |  |  |  | 100 |
|  | I-3 |  |  |  |  | 100 | 100 |  |  |
|  | I-4 |  |  |  |  |  |  |  |  |
| Styrenic triblock copolymer | I'-1 |  |  |  |  |  |  |  |  |
| Tackifier resins | Foral 85E | 5 |  |  |  |  |  |  |  |
|  | Foral 105E |  | 5 |  |  |  |  |  |  |
|  | Ysertack 311 |  |  | 5 |  |  | 10 |  |  |
|  | Ysertack 313 |  |  |  | 5 |  |  |  |  |
|  | Pensel D125 |  |  |  |  | 5 |  |  |  |
|  | YS Resin SX100 |  |  |  |  |  |  | 5 |  |
|  | Kristalex F100 |  |  |  |  |  |  |  | 5 |
|  | Arkon P-100 |  |  |  |  |  |  |  |  |
| Plasticizer | Diana Process PW-380 |  |  |  |  |  |  |  |  |
| Acrylic random copolymer (B) |  |  |  |  |  |  |  |  |  |
| Breathability 1 (g/m² · 24 hr, 100 μm) |  | 590 | 590 | 620 | 620 | 680 | 690 | 590 | 590 |
| Laminate evaluation | Through hole shape | Mesh Shape 1 | Mesh Shape 1 | Mesh Shape 1 | Mesh Shape 1 | Mesh Shape 1 | Mesh Shape 1 | Mesh Shape 1 | Mesh Shape 1 |
|  | Through hole size (μm) | 800 | 800 | 800 | 800 | 800 | 800 | 800 | 800 |
|  | Base portion width (μm) | 300 | 300 | 300 | 300 | 300 | 300 | 300 | 300 |
|  | Thickness (μm) | 100 | 100 | 100 | 100 | 100 | 100 | 100 | 100 |
|  | Basis weight (g/m²) | 58 | 58 | 58 | 58 | 58 | 58 | 58 | 58 |
|  | Void content (%) | 53 | 53 | 53 | 53 | 53 | 53 | 53 | 53 |
|  | Configuration (fabricated or not) | ○ | ○ | ○ | ○ | ○ | ○ | ○ | ○ |
|  | Substrate (type) | PVC | PVC | PVC | PVC | PVC | PVC | PVC | PVC |
|  | Thickness (μm) | 100 | 100 | 100 | 100 | 100 | 100 | 100 | 100 |
|  | Breathability 2 | 2 | 2 | 2 | 2 | 2 | 2 | 2 | 2 |
|  | Adhesive residue Room temperature | Absent | Absent | Absent | Absent | Absent | Absent | Absent | Absent |
|  | Adhesive residue 70° C., 24 hr | Absent | Absent | Absent | Absent | Absent | Absent | Absent | Absent |
|  | Weight saving | ○ | ○ | ○ | ○ | ○ | ○ | ○ | ○ |
|  | Releasability | A | A | A | A | A | A | A | A |
|  | Applicability 1 | A | A | A | A | A | A | A | A |

TABLE 4

|  |  | Comp. Ex. 1 | Comp. Ex. 2 | Comp. Ex. 3 | Comp. Ex. 4 |
|---|---|---|---|---|---|
| Prod. Ex./Blend Ex. |  | Prod. Ex. 1 | Prod. Ex. 6 | Blend Ex. 10 | Blend Ex. 9 |
| Acrylic triblock copolymers | I-1 | 100 |  |  | 100 |
|  | I-2 |  |  |  |  |
|  | I-3 |  |  |  |  |
|  | I-4 |  |  |  |  |
| Styrenic triblock copolymer | I'-1 |  |  | 100 |  |
| Tackifier resins | Foral 85E |  |  |  |  |
|  | Foral 105E |  |  |  |  |
|  | Ysertack 311 |  |  |  | 25 |
|  | Ysertack 313 |  |  |  |  |
|  | Pensel D125 |  |  |  |  |
|  | YS Resin SX100 |  |  |  |  |
|  | Kristalex F100 |  |  |  |  |
|  | Arkon P-100 |  |  | 150 |  |
| Plasticizer | Diana Process PW-380 |  |  | 50 |  |
| Acrylic random copolymer (B) |  |  | 100 |  |  |
| Breathability 1 (g/m² · 24 hr, 100 μm) |  | 580 | 700 | 30 | 640 |
| Laminate evaluation | Through hole shape | Flat shape | Mesh Shape 1 | Mesh Shape 1 | Mesh Shape 1 |
|  | Through hole size (μm) | — | 800 | 800 | 800 |
|  | Base portion width (μm) | — | 300 | 300 | 300 |
|  | Thickness (μm) | 100 | — | 100 | 100 |
|  | Basis weight (g/m²) | 110 | — | 48 | 58 |
|  | Void content (%) | 0 | — | 53 | 53 |
|  | Configuration (fabricated or not) | ○ | Fabrication failed. | ○ | ○ |
|  | Substrate (type) | PVC | PVC | PVC | PVC |
|  | Thickness (μm) | 100 | 100 | 100 | 100 |
|  | Breathability 2 | 1 | — | 1 | 2 |
|  | Adhesive residue Room temperature | Absent | — | Present | Present |
|  | Adhesive residue 70° C., 24 hr | Absent | — | Present | Present |
|  | Weight saving | Δ | — | ○ | ○ |
|  | Releasability | B | — | B | A |
|  | Applicability 1 | B | — | A | A |

TABLE 5

|  |  | Ex. 17 | Ex. 18 | Ex. 19 | Ex. 20 | Ex. 21 | Ex. 22 | Ex. 23 |
|---|---|---|---|---|---|---|---|---|
| Prod. Ex./Blend Ex. |  | Prod. Ex. 1 | Prod. Ex. 2 | Blend Ex. 1 | Blend Ex. 2 | Blend Ex. 3 | Blend Ex. 5 | Blend Ex. 7 |
| Acrylic triblock copolymers | I-1 | 100 |  | 100 | 100 |  |  |  |
|  | I-2 |  | 100 |  |  | 100 |  | 100 |
|  | I-3 |  |  |  |  |  | 100 |  |
| Styrenic triblock copolymer | I'-1 |  |  |  |  |  |  |  |
| Tackifier resins | Foral 85E |  |  | 5 |  |  |  |  |
|  | Foral 105E |  |  |  | 5 |  |  |  |
|  | Ysertack 311 |  |  |  |  | 5 |  |  |
|  | Pensel D125 |  |  |  |  |  | 5 |  |
|  | YS Resin SX100 |  |  |  |  |  |  | 5 |
|  | Arkon P-100 |  |  |  |  |  |  |  |
| Plasticizer | Diana Process PW-380 |  |  |  |  |  |  |  |
| Acrylic random copolymer (B) |  |  |  |  |  |  |  |  |
| Breathability 1 (g/m² · 24 hr, 100 μm) |  | 580 | 610 | 590 | 590 | 620 | 680 | 620 |
| Laminate evaluation | Through hole shape | Mesh Shape 1 | Mesh Shape 1 | Mesh Shape 1 | Mesh Shape 1 | Mesh Shape 1 | Mesh Shape 1 | Mesh Shape 1 |
|  | Through hole size (μm) | 800 | 800 | 800 | 800 | 800 | 800 | 800 |
|  | Base portion width (μm) | 300 | 300 | 300 | 300 | 300 | 300 | 300 |
|  | Thickness (μm) | 100 | 100 | 100 | 100 | 100 | 100 | 100 |
|  | Basis weight (g/m²) | 58 | 58 | 58 | 58 | 58 | 58 | 58 |
|  | Void content (%) | 53 | 53 | 53 | 53 | 53 | 53 | 53 |
|  | Configuration (fabricated or not) | ○ | ○ | ○ | ○ | ○ | ○ | ○ |
|  | Substrate (type) | Nonwoven fabric | Nonwoven fabric | Nonwoven fabric | Nonwoven fabric | Nonwoven fabric | Nonwoven fabric | Nonwoven fabric |
|  | Thickness (μm) | 95 | 95 | 95 | 95 | 95 | 95 | 95 |
|  | Breathability 3 | 3 | 3 | 3 | 3 | 3 | 3 | 3 |
|  | Adhesive residue Room temperature | Absent | Absent | Absent | Absent | Absent | Absent | Absent |

TABLE 5-continued

|  | Ex. 17 | Ex. 18 | Ex. 19 | Ex. 20 | Ex. 21 | Ex. 22 | Ex. 23 |
|---|---|---|---|---|---|---|---|
| Adhesive residue 70° C., 24 hr | Absent | Absent | Absent | Absent | Absent | Absent | Absent |
| Weight saving | ○ | ○ | ○ | ○ | ○ | ○ | ○ |
| Releasability | A | A | A | A | A | A | A |
| Applicability 1 | A | A | A | A | A | A | A |

TABLE 6

| | | | Comp. Ex. 5 | Comp. Ex. 6 | Comp. Ex. 7 | Comp. Ex. 8 |
|---|---|---|---|---|---|---|
| | Prod. Ex./Blend Ex. | | Prod. Ex. 1 | Prod. Ex. 6 | Blend Ex. 10 | Blend Ex. 11 |
| | Acrylic triblock copolymers | I-1 | 100 | | | |
| | | I-2 | | | | 100 |
| | | I-3 | | | | |
| | Styrenic triblock copolymer | I'-1 | | | 100 | |
| | Tackifier resins | Foral 85E | | | | |
| | | Foral 105E | | | | |
| | | Ysertack 311 | | | | |
| | | Pensel D125 | | | | |
| | | YS Resin SX100 | | | | 25 |
| | | Arkon P-100 | | | 150 | |
| | Plasticizer | Diana Process PW-380 | | | 50 | |
| | Acrylic random copolymer (B) | | | 100 | | |
| Laminate evaluation | Breathability 1 (g/m² · 24 hr, 100 μm) | | 580 | 700 | 30 | 640 |
| | Through hole shape | | Flat shape | Mesh Shape 1 | Mesh Shape 1 | Mesh Shape 1 |
| | Through hole size (μm) | | — | 800 | 800 | 800 |
| | Base portion width (μm) | | — | 300 | 300 | 300 |
| | Thickness (μm) | | 100 | — | 100 | 100 |
| | Basis weight (g/m²) | | 110 | — | 48 | 58 |
| | Void content (%) | | 0 | — | 53 | 53 |
| | Configuration (fabricated or not) | | ○ | Fabrication failed. | ○ | ○ |
| | Substrate (type) | | Nonwoven fabric | Nonwoven fabric | Nonwoven fabric | Nonwoven fabric |
| | Thickness (μm) | | 95 | 95 | 95 | 95 |
| | Breathability 3 | | 1 | — | 2 | 3 |
| | Adhesive residue Room temperature | | Absent | — | Present | Present |
| | Adhesive residue 70° C., 24 hr | | Absent | — | Present | Present |
| | Weight saving | | Δ | — | ○ | ○ |
| | Releasability | | B | — | B | A |
| | Applicability 1 | | B | — | A | A |

TABLE 7

| | | | Ex. 24 | Ex. 25 | Ex. 26 | Comp. Ex. 9 |
|---|---|---|---|---|---|---|
| | Prod. Ex./Blend Ex. | | Prod. Ex. 1 | Prod. Ex. 1 | Prod. Ex. 1 | Prod. Ex. 1 |
| | Acrylic triblock copolymers | I-1 | 100 | 100 | 100 | 100 |
| | | I-2 | | | | |
| | | I-3 | | | | |
| | | I-4 | | | | |
| | Styrenic triblock copolymer | I'-1 | | | | |
| | Tackifier resins | Foral 85E | | | | |
| | | Foral 105E | | | | |
| | | Ysertack 311 | | | | |
| | | Ysertack 313 | | | | |
| | | Pensel D125 | | | | |
| | | YS Resin SX100 | | | | |
| | | Kristalex F100 | | | | |
| | | Arkon P-100 | | | | |
| | Plasticizer | Diana Process PW-380 | | | | |
| | Acrylic random copolymer (B) | | | | | |
| | Breathability 1 (g/m² · 24 hr, 100 μm) | | 580 | 580 | 580 | 580 |

TABLE 7-continued

| | | Ex. 24 | Ex. 25 | Ex. 26 | Comp. Ex. 9 |
|---|---|---|---|---|---|
| Laminate evaluation | Structural body 1 including base portion and through holes | Mesh Shape 4 | Mesh Shape 4 | Mesh Shape 4 | Flat shape |
| | Substrate (type, thickness (μm)) | PVC, 100 μm | PVC, 300 μm | PVC, 300 μm | PVC, 100 μm |
| | Structural body 2 including base portion and through holes | Mesh Shape 4 | Mesh Shape 4 | Mesh Shape 3 | Flat shape |
| | Breathability 2 | 2 | 2 | 2 | 1 |
| | Weight saving | ○ | ○ | ○ | Δ |
| | Releasability | A | A | A | B |
| | Applicability 2 | A | A | A | B |
| | Applicability 3 | A | A | A | B |
| | Adherend contamination | Absent | Absent | Absent | Present |

The invention claimed is:

1. A laminate, comprising:
a substrate; and
a structural body disposed on the surface of at least one side of the substrate,
the structural body comprising a base portion and a through hole in the base portion,
wherein
the base portion including the through hole directly contacts the substrate,
the base portion of the structural body comprises not less than 80% by mass of an acrylic triblock copolymer (I) and is free from tackifier resins,
the acrylic triblock copolymer (I) comprising two polymer blocks (A1) and (A2) each including methacrylic acid ester units and one polymer block (B) including acrylic acid ester units of formula (1)

$$CH_2=CH-COOR^1 \quad (1)$$

wherein $R^1$ denotes a C4-C12 organic group,
the acrylic triblock copolymer (I) having an (A1)-(B)-(A2) block structure and a weight average molecular weight of 50,000 to 250,000, and
the total content of the polymer blocks (A1) and (A2) is not more than 35 mass % of the acrylic triblock copolymer (I).

2. The laminate according to claim 1, wherein the methacrylic acid ester is selected from the group consisting of methyl methacrylate, ethyl methacrylate, tert-butyl methacrylate, cyclohexyl methacrylate, isobornyl methacrylate and phenyl methacrylate.

3. The laminate according to claim 1, wherein a glass transition temperature (Tg) of the polymer blocks (A1) and (A2) is from 60° C. to 140° C.

4. The laminate according to claim 1, wherein the acrylic acid ester of formula (1) is selected from the group consisting of n-butyl acrylate, isobutyl acrylate, sec-butyl acrylate, tert-butyl acrylate, n-pentyl acrylate, isopentyl acrylate, n-hexyl acrylate, 2-ethylhexyl acrylate, n-octyl acrylate, isooctyl acrylate, decyl acrylate, isobornyl acrylate, lauryl acrylate, cyclohexyl acrylate, phenyl acrylate and benzyl acrylate.

5. The laminate according to claim 1, wherein a glass transition temperature (Tg) of the polymer block (B) is from −100° C. to 30° C.

6. The laminate according to claim 1, wherein the substrate is selected from the group consisting of a paper, a resin sheet, a resin film, and a woven or nonwoven fabric of a fibrous material.

7. The laminate according to claim 6, wherein the substrate is a resin sheet or resin film and the resin is a thermoplastic polymer is at least one selected from the group consisting of polyesters, polyamides, acrylic resins, polyurethanes, polyethylenes, polypropylenes, and vinyl chloride resins.

8. The laminate according to claim 6, wherein the substrate is a woven or nonwoven fabric of a fibrous material and the fibrous material is at least one selected from the group consisting of polyesters, polyamides, acrylic resins, polyurethanes, polyethylenes, polypropylenes, vinyl chloride resins, cottons, hemps, silks, wools, glass fibers and carbon fibers.

9. A laminate comprising a substrate and a structural body disposed on the surface of at least one side of the substrate, the structural body comprising a base portion and a through hole, wherein
the base portion including the through hole directly contacts the substrate,
the base portion of the structural body comprises not less than 80% by mass of an acrylic triblock copolymer (I) and a tackifier resin, the acrylic triblock copolymer (I) comprising two polymer blocks (A1) and (A2) each including methacrylic acid ester units and one polymer block (B) including acrylic acid ester units represented by the general formula $CH_2=CH-COOR^1$ (1) (wherein $R^1$ denotes a C4-C12 organic group), the acrylic triblock copolymer (I) having an (A1)-(B)-(A2) block structure and a weight average molecular weight of 50,000 to 250,000, the total content of the polymer blocks (A1) and (A2) being not more than 35 mass % of the acrylic triblock copolymer (I), the tackifier resin/acrylic triblock copolymer (I) mass ratio being not more than 20/100.

* * * * *